(12) United States Patent
Kumawat

(10) Patent No.: US 10,997,770 B1
(45) Date of Patent: May 4, 2021

(54) AUTOMATED ANIMATION OF FONTS

(71) Applicant: Adobe Inc., San Jose, CA (US)

(72) Inventor: Nirmal Kumawat, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/866,979

(22) Filed: May 5, 2020

(51) Int. Cl.
| | | |
|---|---|---|
| *G06T 13/80* | (2011.01) | |
| *G06T 11/20* | (2006.01) | |
| *G06F 40/109* | (2020.01) | |

(52) U.S. Cl.
CPC ............ *G06T 13/80* (2013.01); *G06F 40/109* (2020.01); *G06T 11/203* (2013.01)

(58) Field of Classification Search
None
See application file for complete search history.

(56) References Cited

U.S. PATENT DOCUMENTS

| | | | | |
|---|---|---|---|---|
| 6,504,545 | B1 * | 1/2003 | Browne | .................. G06T 13/00 345/473 |
| 8,847,964 | B2 | 9/2014 | Peters | |
| 2017/0192939 | A1 * | 7/2017 | Milas | ...................... G06T 11/60 |
| 2018/0253883 | A1 * | 9/2018 | Shanbhag | ............... G06T 13/80 |

OTHER PUBLICATIONS

Patterson, Steve, "Create Flaming Hot Fire Text in Photoshop", Photoshopessecntials.com, https://www.photoshopessentials.com/photoshop-text/text-effects/fire-text/, 2020, accessed8847964 May 1, 2020, 5 pages.

Pryadarshn, Manisha, "Which Sensors Do I Have in My Smartphone" How Do They Work?, Fossbytes, https://fossbytes.com/which-smartphone-sensors-how-work/, Sep. 25, 2018, 13 pages.

Nshispter, "CMDeviceMotion", https://nshipster.com/cmdevicemotion/, Sep. 12, 2018, 15 pages.

Bargteil, Adam W. et al., "An Introduction to Physics-Based Animation", SIGGRAPH 18: ACM SIGGRAPH, Article No. 6, https://doi.org/10.1145/3214834.3214849, Aug. 2018, 57 pages.

* cited by examiner

*Primary Examiner* — Jeffrey J Chow
(74) *Attorney, Agent, or Firm* — Kilpatrick Townsend & Stockton LLP

(57) ABSTRACT

Techniques are described for automating animation of fonts. In certain embodiments, segments of a glyph that symbolizes a font character are accessed. Sub-segments are then generated for the glyph by applying an automated segmenting function to the segments. Glyph points are then determined for the glyph based on the generated sub-segments of the glyph. For a glyph point in the glyph points, positions for the glyph point are computed at time points by, for each time point of the time points, applying an effect function to the glyph point. Keyframes are generated corresponding to the time points, wherein each keyframe in the keyframes corresponds to a respective time point in the time points and includes an animation effect generated for the glyph based on respective positions computed for the glyph points at the time point. A font animation is provided based on the keyframes.

20 Claims, 27 Drawing Sheets

AUTOMATED ANIMATION OF FONTS

TECHNICAL FIELD

This disclosure generally relates to fonts. More specifically, but not by way of limitation, this disclosure relates to techniques for animating fonts such as techniques that provide automated animation of glyphs symbolizing font characters.

BACKGROUND

Animation is a process of manipulating images to create moving images. In traditional animation, a series of frames is shown at an appropriate rate to enable a viewer to see a smooth progression in the movement of objects across frames. Some software applications exist to generate animations based on keyframes, which are frames that indicate significant moments in an animation, such as the first appearance of an object. In that case, a user trying to generate an animation is required to provide at least the keyframes.

In many cases, a user may wish to animate text. For instance, when making a video for personal or commercial reasons, the user may wish the video to include text that is animated in a way that is customized or grabs the interest of the viewer. For another example, a user may desire to use text animation as a form of expression for personal use, such as in text or email communication with friends or colleagues. A user may also wish to create a document with fonts that are animated.

Although some applications include tools that can be used to generate animations of text. These tools are difficult to use and require expertise on the part of the user. For instance, in some tools, a user has to convert text to an outline and then manually add points to the outline to enable the text to be animated. The user then has to move those points manually to indicate how the text should change across keyframes during an animation. Certain animation effects, such as a fire effect, require the user to manually add textures or gradients on top of the text, which requires locating appropriate textures or gradients in addition to the manual cost of placing the textures or gradients. These manual manipulations are difficult to execute and require user expertise. As a result, these effects are outside the scope of a typical user.

SUMMARY

This disclosure describes techniques for animating fonts. In certain embodiments, techniques are described that provide automated animation of glyphs symbolizing font characters. Various embodiments are described herein, including methods, systems, non-transitory computer-readable storage media storing programs, code, or instructions executable by one or more processors, and the like.

In certain embodiments, one or more processing devices perform automated operations to implement a font animation. The automated operations include accessing segments of a glyph that symbolizes a font character. In one example, when the glyph is the symbol used for a character in a vector-based font, a computer system accesses a font definition of the vector-based font to extract the segments that form the glyph. In some examples, the computer system preprocesses the segments to convert each line segment of the segments to a corresponding curve segment. As described below, for an animation effect to be shown, an effect function corresponding to the desired animation is selected. Positions of glyph points (i.e., points on the glyph) at various time points are automatically determined by applying the selected effect function to the glyph points at the various time points, and keyframes are generated corresponding to the time points. The keyframes are then used to animate the font per the desired animation effect.

In certain embodiments, after determination of the segments, the automated operations further include generating sub-segments of the segments of the glyph based on application of an automated segmenting function. As an example, the computer system determines a threshold segment length as a function of a dimension of the glyph; for instance, the threshold segment length is set to a percentage of the height of the glyph. The computer system divides each segment into sub-segments such that no sub-segment has a respective length exceeding the threshold segment length. In this manner, the segment is divided into smaller segments (i.e., sub-segments) whose lengths are less than or equal to the threshold segment length. The automated operations further include determining glyph points for the glyph based on the sub-segments of the glyph. For instance, in certain embodiments, the endpoints of each sub-segment are used as the glyph points.

In certain embodiments, the method further includes, for each glyph point in the set of glyph points for a glyph, computing positions for the glyph point at various time points by applying an effect function to the glyph point for each time point. The effect function corresponds to and simulates a desired animation effect, such as a wind effect, a fire effect, a wave effect, or the like. The application of the effect function corresponding to a particular animation effect to a glyph point at a time point corresponding to a keyframe determines an updated position of the glyph point according to the animation effect. To generate a series of keyframes, the computer system applies the effect function to the glyph points over various time points. For a particular keyframe generated for a particular time point, the animation effect in the keyframe is generated based on the positions of the glyph points determined at that particular time point. The computer system can then generate the font animation based on the keyframes.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
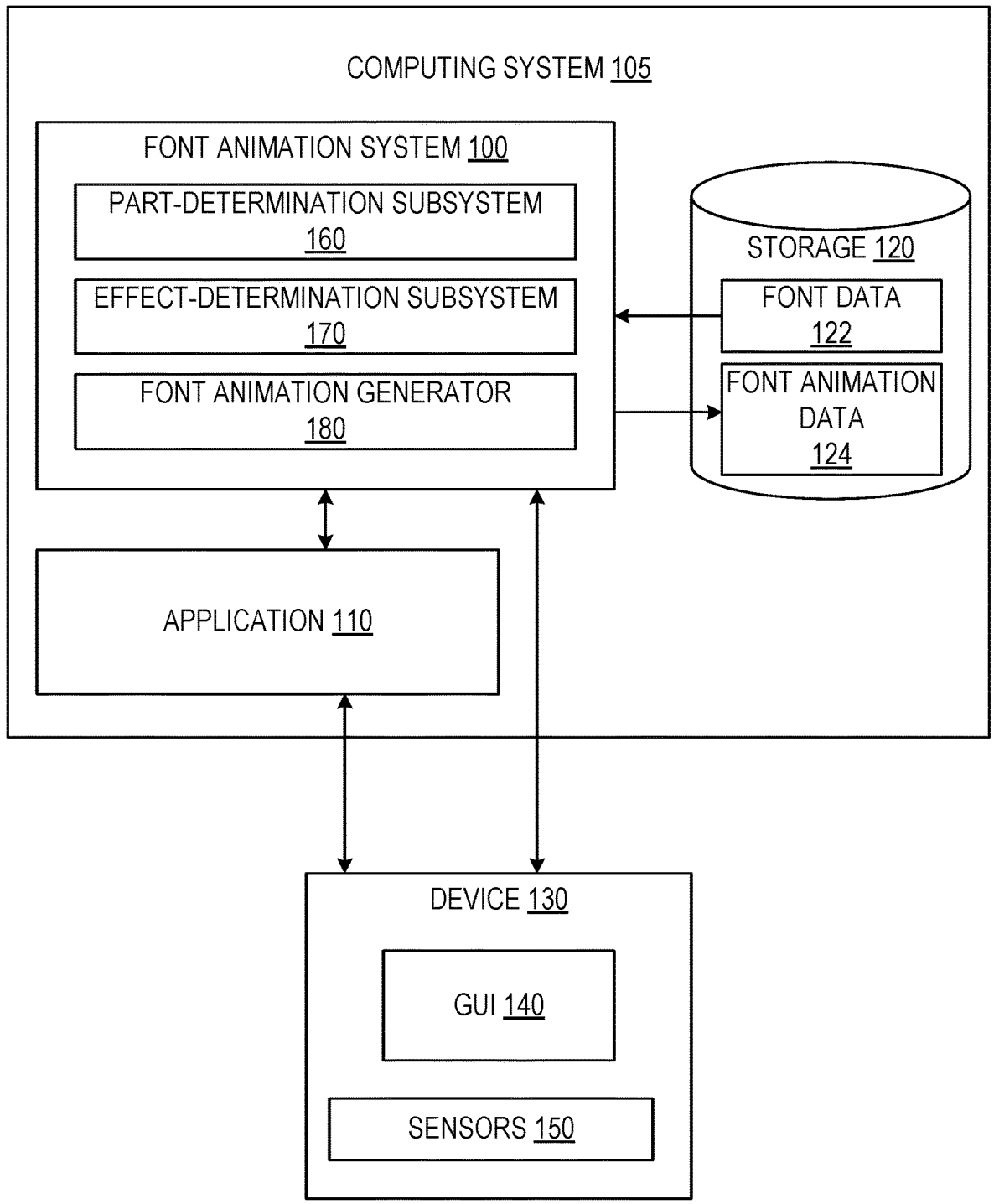
FIG. 1 shows an example of a computing system incorporating a font animation system according to some embodiments described herein.

The present disclosure includes techniques, systems, methods, and computer-program products for generating a font animation in which an animation effect is applied to one or more glyphs, each glyph being a symbol of a character in a font. Certain embodiments described herein improve the technological field of computer fonts, by providing novel automated techniques to generate a font animation (i.e., an animation of one or more glyphs of one or more font characters) of a glyph without requiring manual user manipulations (e.g., without a user having to manually indicate exactly which parts of the glyph should be animated or how exactly the animation is to occur over time).

A font animation system is described herein that is capable of providing various different font animations (e.g., a fire effect, a wave effect, a wind effect, or the like) in an automated manner. In certain embodiments, the font animation system applies a physics-based animation effect to a glyph. Glyph points are determined for a glyph and each glyph point acts as a point mass and is animated according to functions that mimic or encapsulate the laws of physics. Additionally or alternatively, an embodiment automatically determines and modifies segments of a glyph to provide a selective and time-based animation effect to portions of the glyph to achieve complex font animation effects that potentially include randomized aspects for realistic-looking results, without user input as to the precise appearance of the modifications to the glyph.

More specifically, in certain embodiments, for a font character to be animated, the font animation system access font information for the font character and accesses a glyph for the font character. The glyph is then processed to identify segments of the glyph, and the segments are used to determine a set of glyph points on the glyph. In some embodiments, the font animation system preprocesses the segments by automatically dividing the segments into smaller segments (i.e., sub-segments). The glyph points are determined based on the segments and the sub-segments. In certain embodiments, the glyph points may be positioned at the endpoints or control points of the segments of the glyph. The division of segments into sub-segments is performed repeatedly until the lengths of the segments and the sub-segments are below a reference length, which can user-configurable. For example, the reference length may be based upon a user configurable parameter (e.g., a percentage) as applied to a dimension (e.g., height, width) of the glyph being processed.

In some embodiments, the font animation system generates the font animation by generating a sequence of keyframes corresponding to various time points, and then using the keyframes to generate the desired font animation. For each time point corresponding to a keyframe, the font animation system determines a respective position of each glyph point by applying an effect function to the glyph points. For instance, the effect function may be a force function that applies a force to reposition a glyph point or a velocity function that repositions the glyph points based on an indicated velocity. Various different effect functions are provided corresponding to the different font animations. For example, a first set of one or more effect functions may be provided for animating a wind effect, a second set of one or more effect functions may be provided for animating a fire effect, and so on. For a user-selected font animation, the set of effect functions corresponding to the selected font animation are applied to the glyph points. For a particular keyframe generated corresponding to a particular time point, the animation effect in the particular keyframe is generated based on positions of the glyph points determined at that particular time point based on the applicable set of effect functions. The font character is then animated using the generated keyframes.

In certain embodiments, the font animation system modifies segments of a glyph using a time-based rule. In one example, an animation effect is applied selectively to only a proper subset of (i.e., not all of) the segments or glyph points. For example, in certain instances, the effect function may be applied to only certain glyph points based on a direction of a segment in the glyph. For instance, if a direction of a segment indicates that the segment is upward facing (i.e., lies on an upper edge of a glyph outline) on the glyph, then the effect function is applied to the segment or to glyph points on the segment to modify the appearance of the segment; however, if the direction indicates that the segment is downward facing (i.e., lies on a lower edge of a glyph outline), then the effect function does not modify the segment or associated glyph points.

In some embodiments, the font animation that is provided can be influenced by the state of a device, such as a device operated by a user requesting the font animation. For example, the orientation of the user device, a direction of motion of the user device, the speed of the device, the rate of acceleration of the device, a direction of force (e.g., the direction of gravity) exerted on the device, and the like may influence the font animation. In such examples, the effect function corresponding to a font animation is based on one or more parameters that are determined based upon the state of the device. For instance, a force exerted on the device (e.g., by movement or by gravity) is used as a parameter or basis for an effect function being used for the font animation. The state of the device may also be used to determine how glyph points or segments are modified according to an effect function.

The font animation system described herein animates a selected glyph in an automated manner. The user merely has to select the glyphs to be animated and the desired font animation (e.g., wind effect, wave effect, or fire effect). The font animation system then performs the processing that is needed to provide the font animation. In this manner, the user-selected glyphs are animated. This is substantial improvement over conventional systems for animating fonts, in which a user has to manually provide inputs or guidance as to how a glyph should change from keyframe to keyframe. For example, conventionally, the user manually converts a glyph to an outline and then manually add points to the outline of the glyph. The user then manually identifies the positions of the glyph points at each of the time points. Further, for certain animation effects (e.g., a fire effect), the user of a conventional system also manually provides textures or gradients to be applied on top of a glyph outline for the animation. These manual manipulations by the user are difficult, come with high costs, and require user expertise, thus putting such animations outside the scope of a typical user. Even after all the manual manipulations are performed, the resultant animation is typically less than desired. In contrast, the font animation system described herein automates and improves the entire process. After a user has selected the glyphs to be animated and the desired font animation, the font animation system performs the rest of the processing for generating the font animation. This enables even a novice user to provide animated fonts.

In certain embodiments, the font animation system also enables a user to define parameters to control the font animation. For example, for a particular effect, the user can set parameters to control the font animation. For example, for a fire effect, the font animation system provides user-configurable parameters that can control the color of the flames shown in the font animation, the length of the flames, or other characteristics.

The following non-limiting example is provided to introduce certain embodiments. In this example, a user selects a set of characters (e.g., a word, a sentence, or a paragraph) of a font and requests that a particular font animation effect be applied to the selected characters. The font animation system then animates the user-selected characters according to the user-selected animation effect, in this example, a wind effect.

For each character selected by the user, the font animation system accesses a font definition (e.g., vector-based font information) for the font and thus accesses a glyph for the character. The font animation system then accesses segments of the glyph. For instance, a font definition indicates a set of segments for each glyph, and the font animation system accesses the segments associated with the glyph in the font definition. The font animation system then uses the segments to determine glyph points for the glyph. In one instance, based on a size (e.g., height) of the glyph in one or more dimensions, the font animation system divides each segment into smaller segments, referred to as sub-segments, and glyph points are determined corresponding to each segment or sub-segment. For example, the glyph points may correspond to end points and control points of the segments and sub-segments. The division of segments into sub-segments increases the total number of segments, which leads to an increased number of glyph points, which in turn can lead to a smoother animation.

In this example, the font animation system animates the glyphs according to the wind effect in real time. The font animation system generates a sequence of keyframes corresponding to discrete time points representing passage of time, such that the keyframes will be used to provide the font animation. For each time point corresponding to a keyframe, the font animation system determines a respective position of each glyph point by applying an effect function corresponding to the wind effect to the glyph points.

In certain embodiments, the animation system maintains metadata associated with each supported animation effect. The metadata for the wind effect indicates an effect function to be applied to the glyph points, where that effect function is designed to simulate the force of wind. The effect function determines how a glyph point's position changes over time according to the animation effect. In other words, the effect function maps a glyph point's original position or prior position (i.e., a position at a prior keyframe) to an updated position for a certain keyframe based on the time point associated with that keyframe.

For a particular keyframe to be generated for a particular time point, the font animation system implements the wind effect based upon the positions of the glyph points determined by the effect function at that particular time point. For example, the font animation system generates an initial keyframe, $K_0$, corresponding to a time point of $T_0$, which is the first time point in the font animation. Using the effect function associated with the wind effect, the font animation system determines the positions of the glyph points using a time of $T_0=0$ or some other initial time, and these positions are used in the initial keyframe $K_0$. The font animation system then generates the next keyframe, $K_1$, corresponding to time $T_1$. Using the effect function, the font animation system determines the positions of the glyph points at time $T_1$, and these positions are used in the keyframe $K_1$. In this manner, the font animation system generates successive keyframes, which can be used to provide the font animation for the selected characters.

Referring now to the drawings, FIG. 1 shows an example of a computing system 105 incorporating a font animation system 100 according to certain embodiments. The directions of the various arrows shown in FIG. 1 illustrate an example communications flow; however, these arrows are provided for illustrative purposes only and do not limit the various embodiments described herein. The font animation system 100 generates an animation of glyphs in a font (i.e., a font animation) such that, in the animation, an animation effect is applied to a glyph (i.e., a symbol acting as a character in a specific font). An embodiment of the font animation system 100 receives an indication of an animation effect and applies that animation effect to one or more glyphs, where each such glyph is a symbol of a font character (i.e., a character of a font). Upon receiving such indication, the font animation system animates the glyphs by generating a set of keyframes useable to generate the animation.

Figure 2:
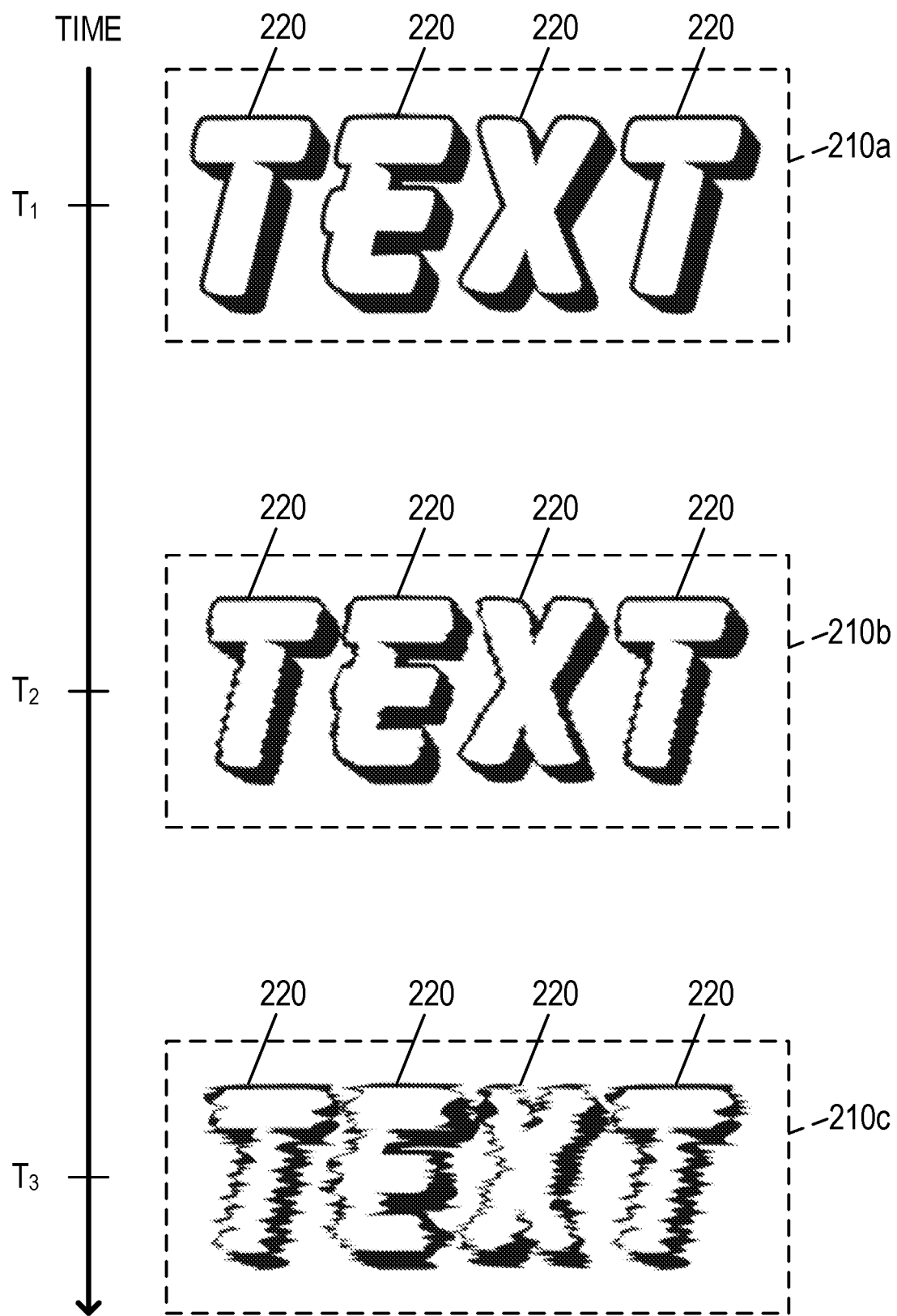
FIG. 2 shows an example of keyframes useable to create a font animation according to some embodiments described herein.

FIG. 2 shows an example of keyframes at three times, or time points, specifically $T_1$, $T_2$, and $T_3$, that are useable to create a font animation according to some embodiments described herein. These keyframes are respectively referred to as the first keyframe 210a, the second keyframe 210b, and the third keyframe 210c; however, it will be understood that a font animation can have more or fewer keyframes. In this example, four glyphs 220, specifically glyphs 220 of the letters T, E, X, and T in a specific font were typed by a user or otherwise input into the font animation system 100. Together, the glyphs 220 form the word TEXT. The user requests that an animation effect, specifically a wave effect, be applied to the glyphs 220 to provide a font animation. Responsive to this request, an example of the font animation system 100 generates the first keyframe 210a based on the initial appearance of the glyphs 220 and generates additional keyframes, including the second keyframe 210b and the third keyframe 210c, based on application of the animation effect. When combined together, the keyframes can be used as the basis of a font animation that shows a wave effect applied to the glyphs 220.

Referring back to FIG. 1, the embodiment depicted is merely an example and is not intended to unduly limit the scope of claimed embodiments. One of ordinary skill in the art would recognize many possible variations, alternatives, and modifications. For example, in some implementations, more or fewer systems or components than those shown in FIG. 1 may be provided, two or more systems or components may be combined, or a different configuration or arrangement of systems and components may be provided. The systems, subsystems, and other components depicted in FIG. 1 may be implemented in software (e.g., program code or instructions) executed by one or more processing units (e.g., processors, cores), in hardware (e.g., as a specialized hardware circuit installed on the computing system 105), or combinations thereof. The software may be stored on a non-transitory storage medium such as memory device.

For example, in the embodiment depicted in FIG. 1, the font animation system 100 runs on the computing system 105. In alternative embodiments, the font animation system 100 may run on a distributed system of computing devices. For example, the font animation system 100 may be implemented by one or more computing systems of a cloud service provider infrastructure. The computing system 105 can be of various types including but not limited to a consumer device such as a desktop computer, a notebook computer, a tablet, or a smartphone. The font animation system 100 may be implemented as program code installed on such a consumer device.

As shown in FIG. 1, an embodiment of the font animation system 100 is in communication with an application 110 running on the computing system 105, such that the font animation system 100 provides the operations described herein through the application 110. Additionally or alternatively, however, the font animation system 100 is integrated with the application 110. For instance, an embodiment of the font animation system 100 is in communication with, or integrated with, an application 110, such as an image-manipulation application such as Adobe® Photoshop®, Adobe Illustrator, or Adobe Premiere®. The application 110 utilizes the font animation system 100 to animate glyphs 220 that symbolize font characters (i.e., characters of a font). In one example, when a user of the application 110 requests for certain glyphs 220 to be animated, the application 110 communicates with the font animation system 100, which generates the keyframes of the animation. The font animation system provides the animation to the application 110, such as by providing the keyframes and thereby enabling the application 110 to animate the glyphs 220 or such as by generating the animation based on the keyframes and providing the application with a data structure (e.g., a video clip, an animated gif) of the completed animation.

The font animation system 100 has access to storage 120 of the computing system 105. The storage 120 is, for instance, a volatile or nonvolatile storage device. The storage 120 maintains font data 122 and font animation data 124. For example, font data 122 is data defining a font, including the appearance of glyphs 220. For instance, for each font character supported by the font, the font data 122 describes segments that together form a vector-based glyph 220 used as the font character. For instance, in the case of a vector-based font, an example of a font definition in the font data 122 defines each glyph 220 acting as a font character as a set of segments, each segment of which can be a line or a curve. Font animation data 124 is data describing font animations generated by the font animation system 100. For instance, the font animation data 124 includes, for a font animation, a set of keyframes that form the animation or a video clip or animated gif of the animation. Various data structures may be used to represent a font animation in the font animation data 124. For example, the font data 122 or the font animation data 124 is stored as one or more databases, tables of a database, text files, or other storage objects. Generally, the font animation system 100 accesses font data 122 in the storage 120 when generating a font animation, and the font animation system 100 generates a font animation and stores that font animation in the font animation data 124 of the storage 120.

In some embodiments, a device 130 acts as an output device for the computing device 130 and for the font animation system 100. For instance, the application 110 generates a graphical user interface (GUI) 140 and causes the GUI 140 to be displayed on the device 130. The GUI 140 enables a user to interact with the application 110 and, thus, with the font animation system 100. Further, the user types or otherwise provides glyphs 220 in the GUI 140 and utilizes the GUI 140 to request animation of such glyphs 220. The device 130 communicates this request to the application 110, which communicates with the font animation system 100 to animate the glyphs 220 as described herein. The application 110 then causes the GUI 140 to show the resulting animation of the glyphs 220.

Examples of the device 130 can take various forms. In one example, the device 130 is a monitor in communication with the computing device 130. In another example, however, the device 130 is a screen integrated with the computing device 130; for instance, the device 130 could be a smartphone, tablet, or notebook computer, and the device 130 could be an integrated display. In yet another example, the computing system 105 on which the font animation system 100 runs provides a cloud-based service, and the device 130 is a consumer device utilizing the cloud-based service such that the computing system 105 causes such consumer device to display the GUI 140.

Additionally or alternatively to the above, an example of the device 130 includes one or more sensors 150 configured to detect a device state, or state of the device. The device state includes, for instance, an orientation of the device or a force exerted on the device 130. For example, sensors 150 used by the device 130 to determine a device state can include one or more of an accelerometer, a gyroscope, a magnetometer, or a global positioning system (GPS) device.

As shown in FIG. 1, an embodiment of the font animation system 100 includes a part-determination subsystem 160, an effect-determination subsystem 170, and a font animation generator 180. Generally, the part-determination subsystem 160 determines a set of segments or glyph points of the glyph 220; the effect-determination subsystem 170 determines an effect function to be applied to the segments or glyph points to provide an animation effect and, when the device state is being considered, incorporates one or more parameters of the device state into the effect function; and the font animation generator 180 applies the effect function to various segments or glyph points of a glyph 220 to generate a set of keyframes for the animation. When a font animation is generated (e.g., when the keyframes are generated), the font animation system 100 saves an indication of the animation to the font animation data 124 in the storage 120. For instance, the font animation system 100 stores the keyframes of the animation, an animated gif, or a video clip to the font animation data 124.

Figure 3:
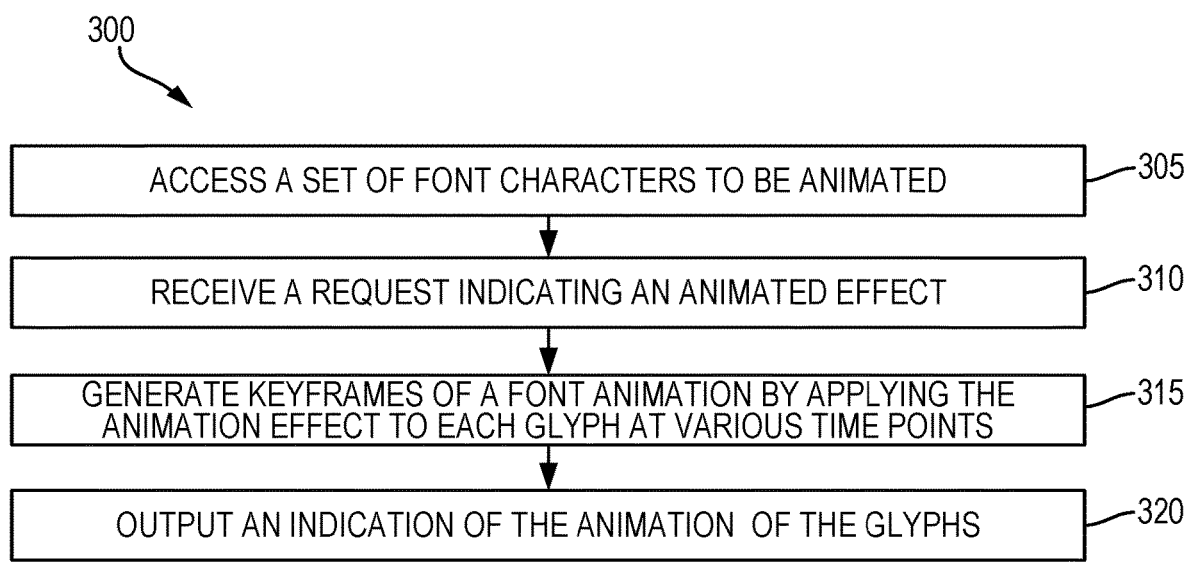
FIG. 3 is a diagram of a process of generating a font animation in which an animation effect is applied to a set of glyphs, according to some embodiments described herein.

FIG. 3 is a diagram of a process 300 of generating a font animation in which an animation effect is applied to a set of glyphs 220, according to some embodiments described herein. The process 300 depicted in FIG. 3, as well as the other processes described herein, may be implemented in software (e.g., code, instructions, or programs) executed by one or more processing units (e.g., processors or processor cores), in hardware, or combinations thereof. The software may be stored on a non-transitory storage medium, such as on a memory device. The process 300 depicted in FIG. 3 and described below is intended to be illustrative and non-limiting. Although FIG. 3 depicts various activities occurring in a particular sequence or order, this is not intended to be limiting. In certain embodiments, for instance, the activities may be performed in a different order, or one or more activities of the process 300 may be performed in parallel. In certain embodiments, such as in the embodiment depicted in FIG. 1, the process 300 may be performed by the font animation system 100.

As shown in FIG. 3, at block 305, the process 300 involves accessing one or more font characters symbolized as glyphs 220. In one example, a user may type the glyphs 220 into the application, thereby providing the glyphs 220 to the application 110, which communicates the glyphs 220 to the font animation system 100. In another example, the set of glyphs 220 were previously saved, such as in a text block as part of image file or document file. In that case, a user could indicate a location of the text block (e.g., the location of the image file or document file) to the application 110, which accesses the location and communicates the glyphs 220 to the font animation system 100.

At block 310, the process 300 involves receiving a request indicating an animation effect, where the animation effect is to be used to animate the glyphs 220 symbolizing the font characters accessed at block 305. In one example, the user requests a custom animation effect and may provide metadata describing that animation effect; for instance, the user provides an effect function (e.g., a force function indicating an application of force) to be utilized for the animation effect. In another example, the font animation system 100 maintains respective metadata for each animation effect in a set of known animation effect. Such animation effects include, for instance, one or more of the following: a wave effect, a water flow effect, a wind effect, a cloths effect, a fire effect, a melting effect, a grass effect, a leaf effect, and a freefall effect. For each animation effect known to the font animation system 100, an example of the font animation system 100 has access to metadata associated with the animation effect and describing how to execute the animation effect. The metadata associated with an animation effect indicates, for example, an effect function used to apply the animation effect or an indication of how to select which segments or glyph points of the glyph points are affected by the effect function. In an embodiment in which the font animation system 100 maintains metadata about known animation effects, an example of the font animation system 100 enables the user to select one or more of such known animation effects to use as the animation effect for animating the glyphs 220 accessed at block 305.

At block 315, the process 300 involves generating keyframes of a font animation by applying the animation effect to each glyph 220 at various time points. In other words, an embodiment of the font animation system 100 applies the animation effect indicated at block 310 to the glyphs 220 accessed at block 305. To this end, for instance, the font animation system 100 utilizes information in the metadata, such as the associated effect function, to determine how to generate a set of keyframes based on the glyphs 220. In some embodiments, generating keyframes involves (a) generating glyph points on for each glyph 220 to be animated, as described further in FIG. 4, and (b) generating the keyframes, which correspond to various time points, based on application of the effect function to the glyph points at the various time points, as described further in FIG. 10 and FIG. 11. The keyframes are then useable as a basis for the animation; for instance, various techniques exist for determining a font animation based on keyframes, and the font animation system 100 or the application 110 can use one or more of such techniques.

At block 320, the process 300 involves outputting an indication of the animation of the glyphs 220. For instance, the font animation system 100 outputs the keyframes generated at block 315 as the indication of the animation, or the font animation system 100 outputs the animation itself, such as in the form of a video clip, an animated gif, or a proprietary format. To output the indication of the animation, an example of the font animation system 100 outputs the keyframes to the application 110, which can generate and display the animation, or causes the device 130 to display the animation based on the keyframes. Various techniques can be used to output an indication of the animation.

Determination of Segments and Glyph Points

Figure 4:
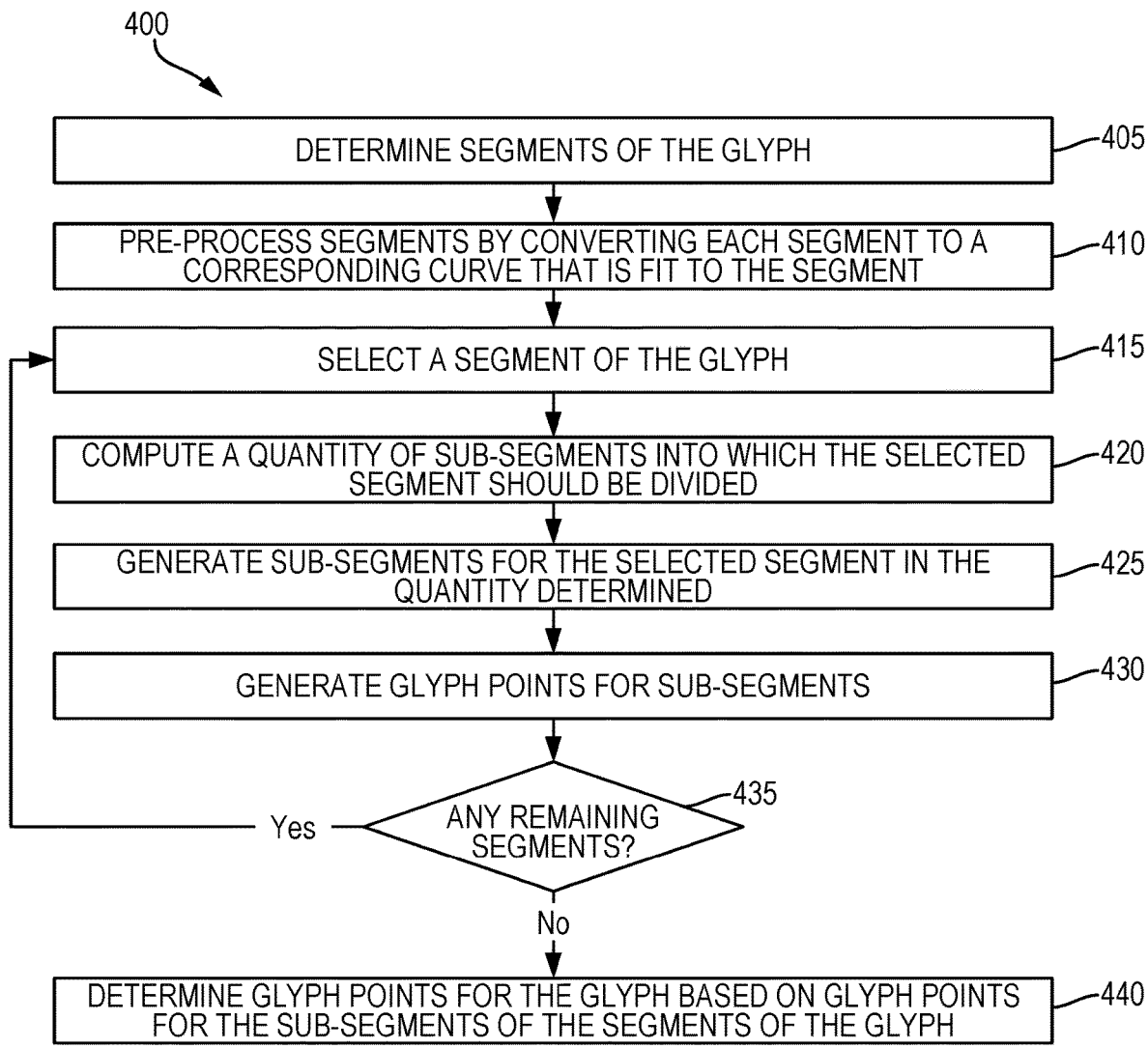
FIG. 4 is a diagram of a process of generating segments and glyph points of a glyph, according to some embodiments described herein.

FIG. 4 is a diagram of a process 400 of generating segments and glyph points of a glyph, according to some embodiments described herein. A glyph point is a point on a glyph 220, for instance, on an outline of the glyph 220 or at an interior position on the glyph 220. In some embodiments, as will be described in detail below, the font animation system 100 treats each glyph point of a glyph 220 as a particle, or point mass, that can be moved based on application of an effect function associated with the animation effect being applied.

In some embodiments, this process 400 of FIG. 4 is a sub-process for generating keyframes, as performed at block 315 of the process 300 described above for animating glyphs 220. For each glyph 220 to be animated (i.e., for each glyph 220 accessed at block 305), an embodiment of the font animation system 100 performs this process 400 to generate the glyph points of that glyph 220. After generation of the glyph points, the font animation system 100 generates keyframes based on movements of the glyph points caused by application of an effect function.

The process 400 depicted in FIG. 4, as well as the other processes described herein, may be implemented in software (e.g., code, instructions, or programs) executed by one or more processing units (e.g., processors or processor cores), in hardware, or combinations thereof. The software may be stored on a non-transitory storage medium, such as on a memory device. The process 400 depicted in FIG. 4 and described below is intended to be illustrative and non-limiting. Although FIG. 4 depicts various activities occurring in a particular sequence or order, this is not intended to be limiting. In certain embodiments, for instance, the activities may be performed in a different order, or one or more activities of the process 400 may be performed in parallel. In certain embodiments, such as in the embodiment depicted in FIG. 1, the process 400 may be performed by the font animation system 100.

As shown in FIG. 4, at block 405, the process 400 involves determining segments of a glyph 220. In some embodiments, the font animation system 100 operates on vector-based glyphs 220, each of which is a symbol of a character from vector-based fonts. Typically, a font definition of a font that is vector based defines each glyph 220 (i.e., the symbol for each character) as an ordered set of segments or an ordered set of points, such that rendering a glyph 220 involves generating the segments in order or drawing the points in order and adding segments between adjacent points. Thus, in the case of a vector-based font, determining the segments of a glyph 220 can involve accessing the font definition, which may be stored in the font data 122, to extract the segments or to extract the points and, in the latter case, determining segments between the points. However, if the font to which the glyph 220 belongs is not a vector-based font, an embodiment of the font animation system 100 uses an edge-determination technique to identify edges of the glyph 220, and those edges are then used as segments of the glyph 220.

At block 410, the process 400 involves preprocessing the segments by converting each segment of the glyph 220 into a corresponding curve that fits the segment. In some embodiments, the font animation system 100 converts lines to curves because curve segments provide a more smooth animation as compared to line segments. Specifically, an example of the font animation system 100 converts each segment of the glyph 220 to a quadratic Bezier curve, which includes one control point and two anchor points, or endpoints.

To convert a segment that is a straight line to a curve, specifically a quadratic Bezier curve, an embodiment of the font animation system 100 adds a control point on the segment itself; for instance, the font animation system 100 adds a control point at the center of the segment. The endpoints of the segment become anchor points of the curve. If a segment of the glyph 220 is a curve segment of a different type of curve than the type desired (e.g., quadratic Bezier curves), then an embodiment of the font animation system 100 fits the desired type of curve to the existing curve segment, such as by using a curve-fitting technique known in the art.

Figure 5:
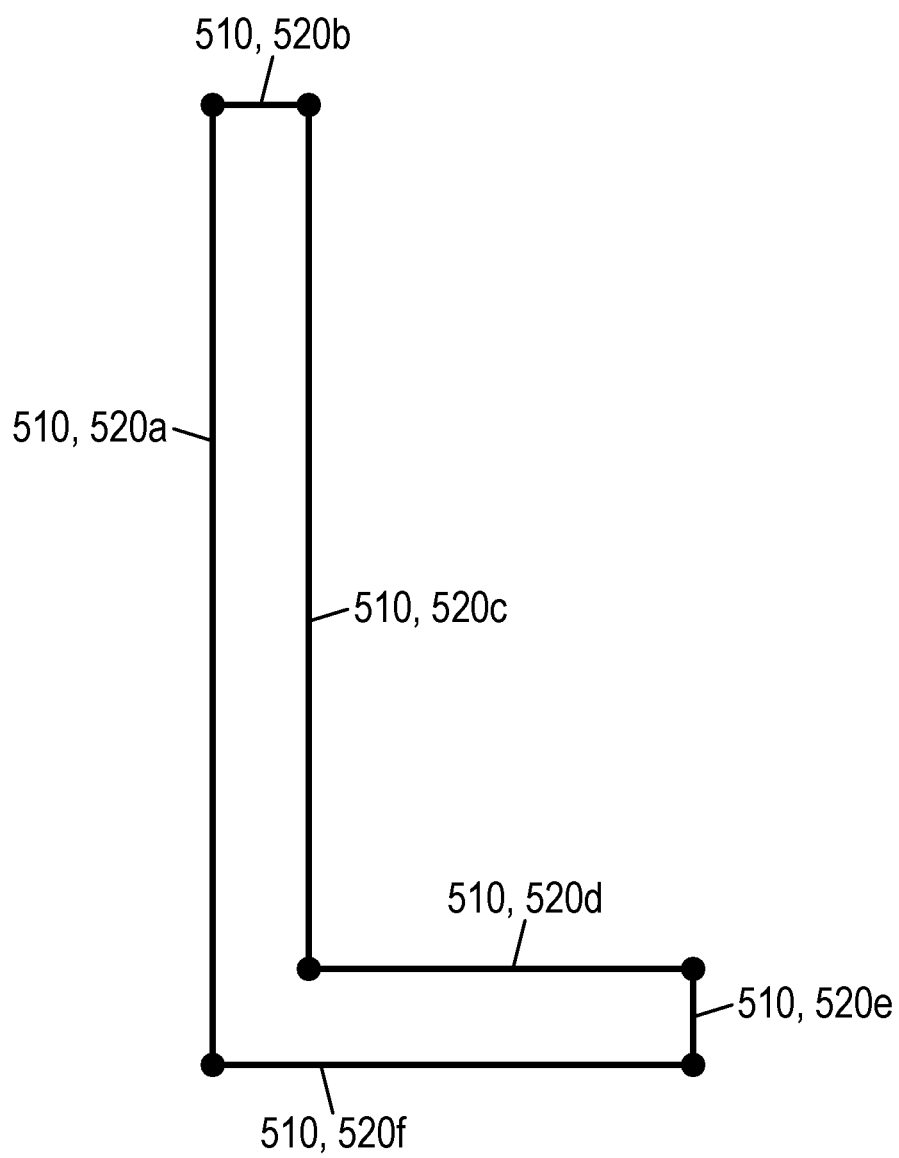
FIG. 5 shows an example of a glyph, according to some embodiments described herein.

For instance, FIG. 5 shows an example of a glyph 220, according to some embodiments described herein. In the example of FIG. 5, the glyph 220 includes six segments 510, each of which is a line segment, or line, in this example. Specifically, these segments are a first line segment 520a, a second line segment 520b, a third line segment 520c, a fourth line segment 520d, a fifth line segment 520e, and a sixth line segment 520f.

Figure 6:
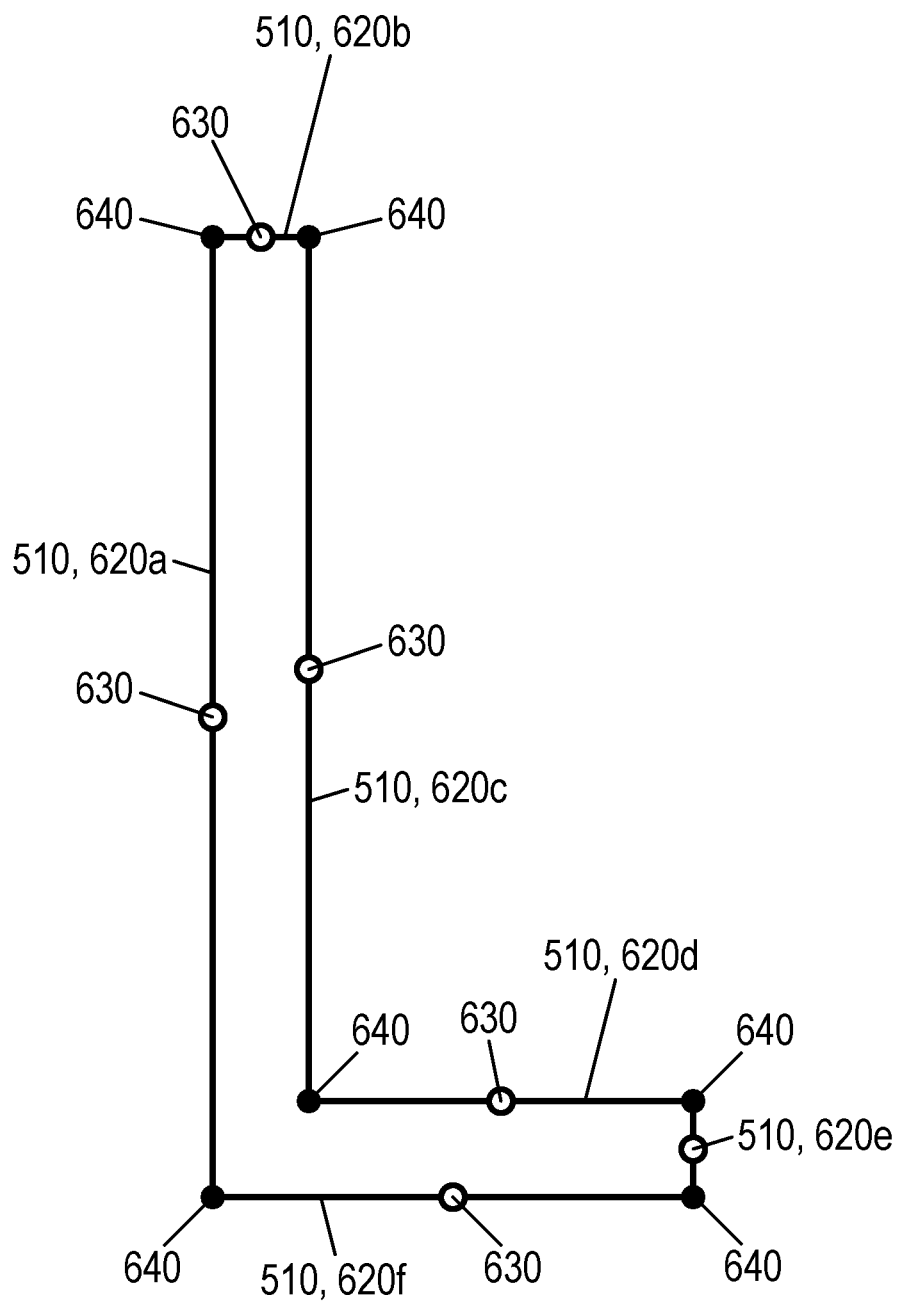
FIG. 6 shows the example glyph of FIG. 5 after segments of the glyph are converted from lines to curves, according to some embodiments described herein.

FIG. 6 shows the example glyph 220 of FIG. 5 after the segments 510 have been converted from lines to curves, according to some embodiments. In the example of FIG. 6, each segment 510 is now a curve segment, or curve. Specifically, the font animation system converted the first line segment 520a, the second line segment 520b, the third line segment 520c, the fourth line segment 520d, the fifth line segment 520e, and the sixth line segment 520f into a first curve segment 620a, a second curve segment 620b, a third curve segment 620c, a fourth curve segment 620d, a fifth curve segment 620e, and a sixth curve segment 620f respectively. In this example, the font animation system 100 converted each line segment into a respective curve segment by adding a control point 630 at the center of the line segment and using the endpoints as anchor points 640. Further, in some embodiments, to create an even smoother animation, the font animation system 100 ensures that each segment 510 is no longer than a threshold length, as described below.

Referring back to FIG. 4, at block 415, the process 400 includes selecting a segment 510 of the glyph 220. As described above, each segment 510 at this point is a curve segment in some embodiments. Block 415 begins an iterative loop in which each segment 510 is considered and divided into sub-segments as needed, such as to ensure that the quantity or length of sub-segments of a segment 510 complies with some segmentation criteria. Generally, a higher number of sub-segments for a segment corresponds to a shorter length of the sub-segments, and a lower number of sub-segments corresponds to a longer length of such sub-segments. While more numerous, shorter sub-segments may achieve smoother animation results, the use of a relatively large number of sub-segments can increase computation time in terms of generating the sub-segments and in terms of determining the positions of glyph points in the keyframes because glyph points may be based on the sub-segments. Thus, in some embodiments, a tradeoff exists between computation time and animation smoothness.

At block 420, the process 400 involves computing the quantity, or count, of sub-segments into which the selected segment 510 of the glyph 220 is to be divided. To this end, an embodiment of the font animation system 100 maintains, or otherwise has access to, segmentation criteria defining how to divide a segment into sub-segments. An example of the segmentation criteria requires that no sub-segment exceed a threshold length and, further, that threshold length may be based on, or a function of, a length of the glyph 220 in one or more dimensions.

Specifically, an example of the segmentation criteria requires that the length, or estimated length, of a sub-segment be no more than some percent, such as ten percent, of the length of the longest dimension (i.e., the longest dimension of the minimum bounding box) of the glyph 220. In that case, the quantity N of sub-segments for the selected segment 510 is $N = \lceil s/L \rceil$, where s is the length of the selected segment and L is the length of the glyph 220 in its longest dimension.

The example of FIG. 5 and FIG. 6 is a simplified example in which the curve segments are converted from line segments, and thus, the lengths of the curve segments are easy to compute. However, computing the length of a curve segment that is not straight can require more complex computations. For instance, the formula for a quadratic Bezier curve, which is a three-points Bezier curve with two anchor points 640 and a control point 630, is given by $P=(1-t)^2 P_1 + 1(1-t)tP_2 + t^2 P_3$, where $P_1$ and $P_3$ are anchor points 640 and $P_2$ is a control point 630. In one example, the font animation system 100 computes the length of a curve segment through the use of integrating this formula for each curve segment for which the length is desired. However, another example of the font animation system utilizes a heuristic to compute an estimated length of a curve segment because a precise length of curve segments is not needed in some embodiments. In that case, the estimated length is used to determine how to divide a segment 510 into sub-segments and, more specifically, to determine the quantity of sub-segments into which a segment 510 is to be divided.

Specifically, in some embodiments, to compute an estimated length of a curve segment $(P_1, P_2, P_3)$, having anchor points $P_1$ and $P_3$ and a control point $P_2$, the font animation system 100 computes the lengths of two lines, including a first line that extends from a first anchor point $P_1$ to the control point $P_2$ and a second line that extends from the control point $P_2$ to a second anchor point $P_3$. The first line has a length of $(P_1.x - P_2.x)^2 + (P_1.y - P_2.y)^2$, where $P_1.x$ is the x-coordinate of the first anchor point $P_1$; $P_2.x$ is the x-coordinate of the control point $P_2$; $P_1.y$ is the y-coordinate of the first anchor point $P_1$; and $P_2.y$ is the y-coordinate of the control point $P_2$. The second line has a length of $(P_2.x - P_3.x)^2 + (P_2.y - P_3.y)^2$, where $P_2.x$ is the x-coordinate of the control point $P_2$; $P_3.x$ is the x-coordinate of the second anchor point $P_3$; $P_2.y$ is the y-coordinate of the control point $P_2$; and $P_3.y$ is the y-coordinate of the second anchor point $P_3$. The font animation system 100 sets the estimated length of the curve segment to the sum of the lengths of these two lines. Thus, in some embodiments, the font animation system 100 computes the quantity of sub-segments into which to divide a curve segment as follows:

$$N = \frac{\sqrt{(P_1 \cdot x - P_2 \cdot x)^2 + (P_1 \cdot y - P_2 \cdot y)^2} + \sqrt{(P_2 \cdot x - P_3 \cdot x)^2 + (P_2 \cdot y - P_3 \cdot y)^2}}{L}$$

Referring back to FIG. 4, at block 425, the process 400 involves generating sub-segments for the selected segment 510 in the quantity determined at block 420. When the selected segment 510 is straight, this can involve dividing the length of the selected segment 510 by the quantity to determine a sub-segment length and then dividing the selected segment 510 into sub-segments, each having a length equal to the sub-segment length. However, in the case of a selected segment 510 that is not straight, an embodiment of the font animation system 100 uses a heuristic to divide the selected segment 510 into sub-segments 810.

Figure 7:
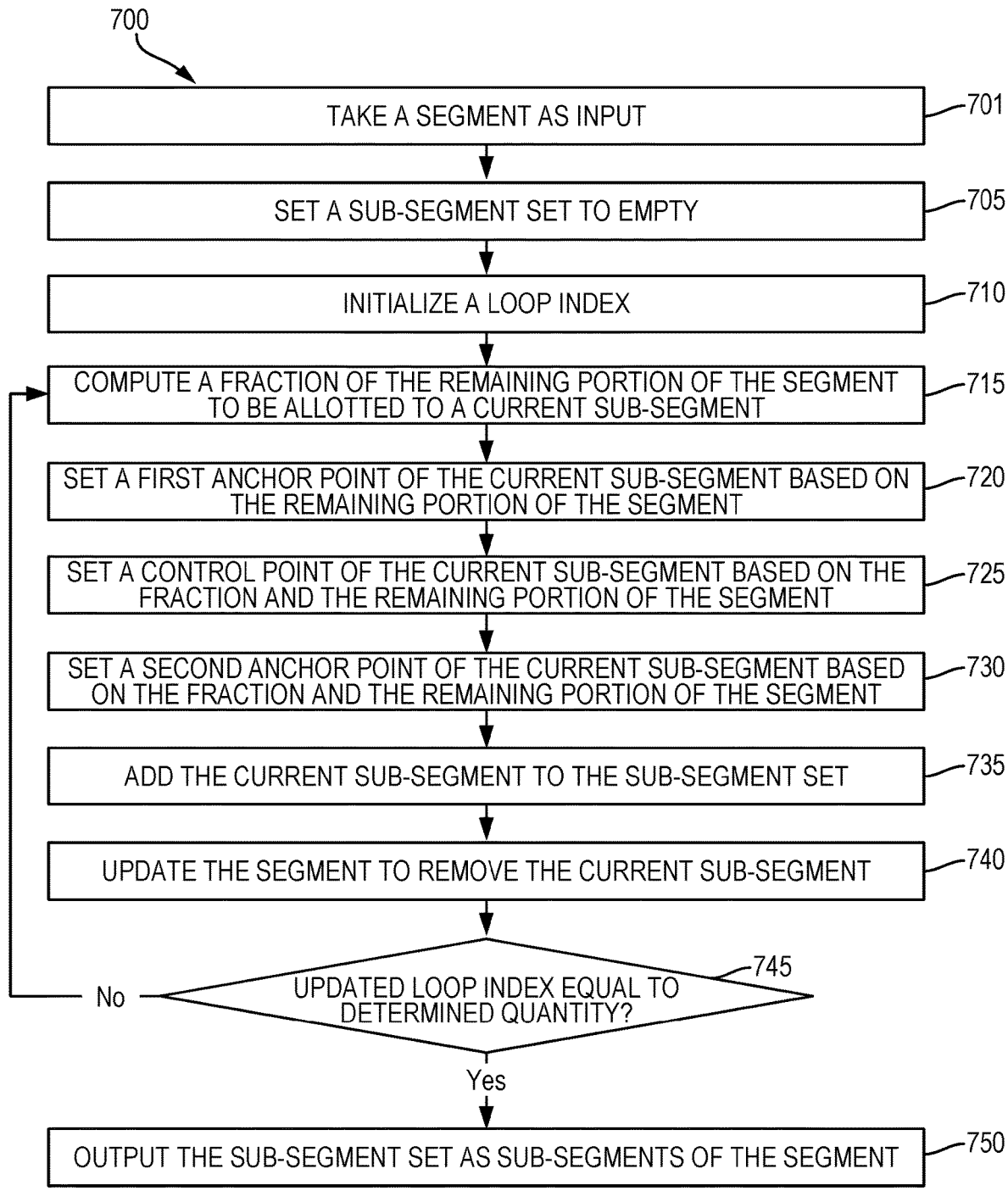
FIG. 7 is a diagram of a process of dividing a segment of a glyph into sub-segments, according to some embodiments described herein.

FIG. 7 is a diagram of a process 700 of dividing a selected segment 510 into sub-segments 810 in a given quantity, according to some embodiments. The process 700 is an example of an automated segmenting function that automatically divides a segment 510 into sub-segments without intervention. For instance, an example of the font animation system 100 performs this process 700 at block 425 of the process 400 described herein for determining glyph points of a glyph 220. Specifically, for instance, an example of the font animation system 100 performs this process 700 or similar when the selected segment 510 is not straight and the quantity determined at block 420 is greater than 1. When the value of the quantity is 1, then the resulting sub-segments include only the original segment 510.

The process 700 depicted in FIG. 7, as well as the other processes described herein, may be implemented in software (e.g., code, instructions, or programs) executed by one or more processing units (e.g., processors or processor cores), in hardware, or combinations thereof. The software may be stored on a non-transitory storage medium, such as on a memory device. The process 700 depicted in FIG. 7 and described below is intended to be illustrative and non-limiting. Although FIG. 7 depicts various activities occurring in a particular sequence or order, this is not intended to be limiting. In certain embodiments, for instance, the activities may be performed in a different order, or one or more activities of the process 700 may be performed in parallel. In certain embodiments, such as in the embodiment depicted in FIG. 1, the process 700 may be performed by the font animation system 100.

As shown in FIG. 7, at block 701, the process 700 takes as input a segment, specifically the selected segment 510 that was selected at block 415 of the process 400 for generating glyph points. The selected segment 510 has a first anchor point 640 of $P_1$, a control point of $P_2$, and a second anchor point of $P_3$, and thus, the selected segment can be represented as $(P_1, P_2, P_3)$.

At block 705, the process 700 involves setting a sub-segment set to an empty set, where the sub-segment set represents the sub-segments of the selected segment 510. The sub-segment set will eventually be output from this process 700 as an indication of the various sub-segments into which the selected segment 510 is divided.

At block 710, the process 700 involves initializing a loop index, such as by setting the loop index, i, to 0. The loop index identifies the iteration of a loop, where the loop index indicates how many iterations of a loop have been completed already. As described below, during each iteration, an embodiment of the font-animation system 100 builds a current sub-segment (A, B, C), which is a segment 510 having a first anchor point A, a control point B, and a second anchor point C, of the selected segment 510 and adds that current sub-segment to the sub-segment set. Additionally, in each iteration, an embodiment of the font animation system 100 reduces the selected segment 510 by the current sub-segment such that the sub-segment that will be built during the next iteration is taken from the remaining portion of the selected segment 510. In some embodiments, the font animation system 100 performs the following loop a count of times equal to the quantity determined at block 420, such that the sub-segment set will eventually include sub-segments in that quantity.

Block 715 of the process 700 begins the loop. At block 715, the process 700 involved computing a value of n, where n is a fraction representing what portion remaining in the selected segment 510 is allotted to the current sub-segment. Specifically, for instance, an embodiment of the font animation system 100 computes $$n = \frac{1}{N-i},$$

where N is the quantity of sub-segments determined for the selected segment 510 and i is the current loop index.

At block 720, the process 700 involves setting a value for the first anchor point 640 of the current sub-segment to be added to the sub-segment set. In some embodiments, the font animation system 100 sets the first anchor point A=(A.x, A.y) such that the x-coordinate of the first anchor point 640 is A.x=$P_1$.x and the y-coordinate is A.y=$P_1$.y, which sets the first anchor point 640 of the current sub-segment to the value of the anchor point $P_1$ of the remaining portion the selected segment 510 (i.e., the portion that has not yet been allotted to sub-segments in previous loop iterations). For instance, in the first iteration of the loop (i.e., where the loop index equals 0), this sets the first anchor point 640 of the current sub-segment to the first anchor point 640 of the selected segment 510 being divided into sub-segments.

At block 725, the process 700 involves setting a value for the control point 630 of the current sub-segment to be added to the sub-segment set. In some embodiments, the font animation system 100 sets the control point B=(B.x, B.y) such that B.x=(1−n)$P_1$.x+(n)$P_2$.x and B.y=((1−n)×$P_1$.y)+(n× $P_2$.y), which sets the control point 630 to a point along a Bezier line extending between the first anchor point $P_1$ and the control point $P_2$ of the remainder of the selected segment 510, because P=(1−t)$P_1$+(t)$P_2$ is a formula for a two-points Bezier line.

At block 730, the process 700 involves setting a value for the second anchor point 640 of the current sub-segment to be added to the sub-segment set. In some embodiments, the font animation system 100 sets the second anchor point C=(C.x, C.y) such that C.x=(1−n)$^2$$P_1$.x+2n(1−n)$P_2$.x+(n)$^2$$P_3$.x and C.y=(1−n)$^2$$P_1$.y+2n(1−n)$P_2$.y+(n)$^2$ $P_3$.y, which sets the second anchor point 640 to a point along the remainder of the selected segment 510 because P=(1−t)$^2$+ 2n(1−n)$P_2$+(n)$^2$$P_3$ is a formula fora three-points Bezier curve.

At block 735, the process 700 involves adding the current sub-segment to the sub-segment set. For instance, the font animation system 100 updates the sub-segment set to append the current sub-segment to other sub-segments, if any, indicated in the sub-segment set.

At block 740, the process 700 involves updating the selected segment 510 to remove the current sub-segment that was just added to the sub-segment set. To this end, for instance, an embodiment of the font animation system 100 sets the remainder of the selected segment ($P_1$, $P_2$, $P_3$) such that $P_1$=C, which is the value of the second anchor point 640 of the current sub-segment, and $P_2$=(1−t)$P_2$+(t)$P_3$. In some embodiments, the value of $P_3$ remains as is because the second anchor point 640 of the selected segment 510 is not affected by removal of the current sub-segment.

At decision block 745, the font animation system 100 updates the loop index by incrementing the loop index and, further, determines whether the updated loop index is equal to the quantity N of sub-segments to be determined. If the loop index is not yet equal to the quantity N, then the process 700 returns to block 715 to perform another iteration of the loop. Otherwise, all sub-segments have been determined for the selected segment 510 that was input into the process 700, and the process 700 ends at block 750 by outputting the sub-segment set (i.e., the set of sub-segments into which with the selected segment 510 was divided).

Figure 8:
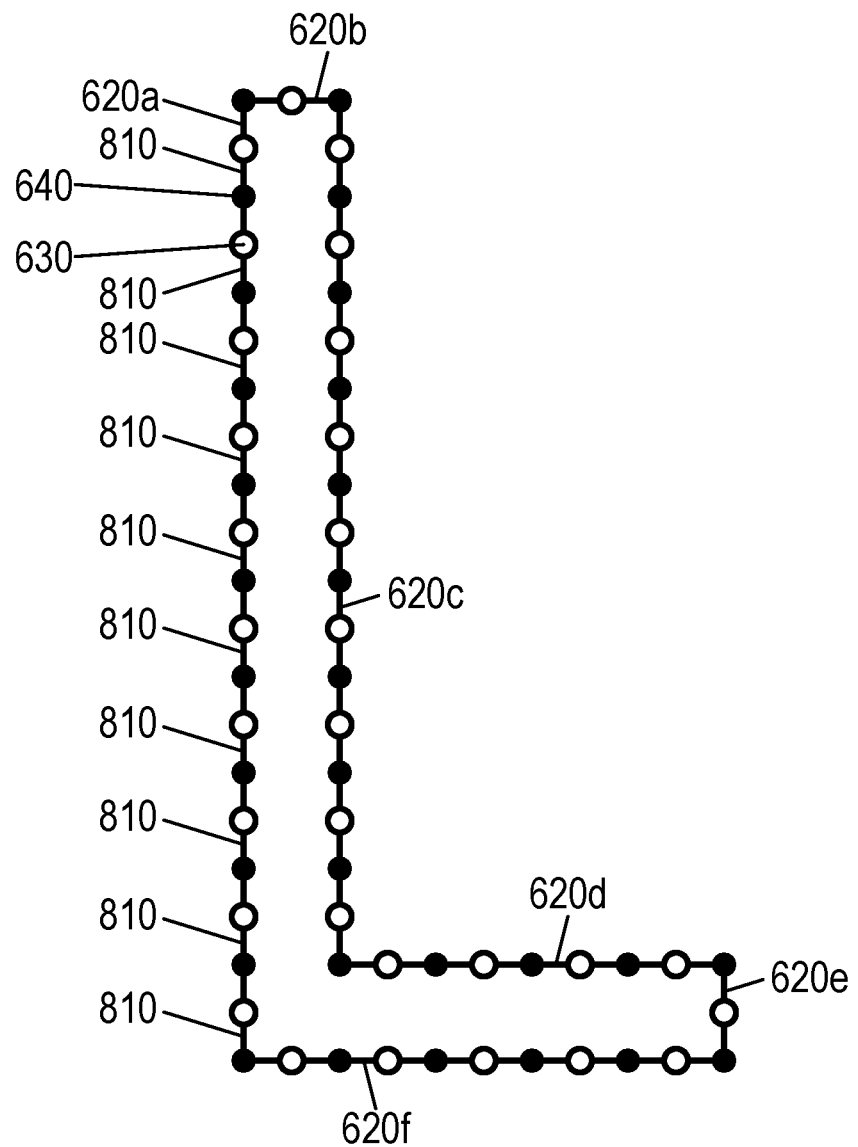
FIG. 8 shows the example glyph of FIG. 5 and FIG. 6, where the segments 510 are divided into sub-segments, according to some embodiments described herein.

FIG. 8 shows the example glyph 220 of FIG. 5 and FIG. 6, where the segments 510 are divided into smaller segments 510, also referred to as sub-segments 810, according to some embodiments described herein. Specifically, in this example, the segmentation criteria require that no sub-segment is longer than ten percent of the length of the glyph 220 in its longest dimension. In this case, the longest dimension is the height of the glyph 220, which is ten units. It will be understood that various units of measure could be used to describe the length of the glyph 220 and the lengths of segments 510 and sub-segments; for instance, the units used could be pixels, inches, or centimeters. Because the glyph 220 is ten units in its longest dimension, this example of the font animation system 100 restricts any segment 510 or sub-segment from being longer than ten percent of that, which is one unit long.

Thus, as shown in FIG. 8, the first curve segment 620*a* has been divided into ten sub-segments 810, such that none of those sub-segments 810 is longer than one unit. As shown, each sub-segment 810 is itself a segment 510 that includes two anchor points 640 and a control point 630. Additionally, in this example, the second curve segment 620*b* has been divided into five sub-segments 810, the third curve segment 620*c* has been divided into one sub-segment 810 (i.e., has not been further divided), the fourth curve segment 620*d* has been divided into four sub-segments 810, the fifth curve segment 620*e* has been divided into nine sub-segments, and the sixth curve segment 620*f* has been divided into one sub-segment 810 (i.e., has not been further divided).

Referring back to FIG. 4, after generating the sub-segments 810, at block 430, the process 400 involves generating glyph points for the sub-segments 810 of the selected segment 510. For instance, in some embodiments, the font animation system 100 sets a glyph point at each anchor point 640 of the sub-segments 810. Where an anchor point 640 is shared by adjacent sub-segments 810, the font animation system 100 counts that anchor point 640 as only a single glyph point in some embodiments. Additionally or alternatively, in some embodiments, the font animation system 100 sets a glyph point at each control point of the sub-segments 810.

At decision block 435, the process 400 involves determining whether any segments 510 remain to be considered in the glyph 220. If a segment 510 has not yet been considered, the process 400 returns to block 415, where a new segment 510 is selected. Otherwise, if all segments 510 have been selected and considered, then the process 400 proceeds to block 440.

At block 440, the process 400 determines glyph points for the glyph 220 as a whole, based on the glyph points of the sub-segments 810 of the various segments 510 of the glyph 220. Specifically, for instance, the font animation system 100 sets the glyph points of the glyph 220 to include the glyph points of the various sub-segments 810, without overlap in some embodiments. Thus, an example set of glyph points for a glyph 220 includes the anchor points or the control points, or a combination of both, of the sub-segments 810 determined for the glyph 220.

Figure 9:
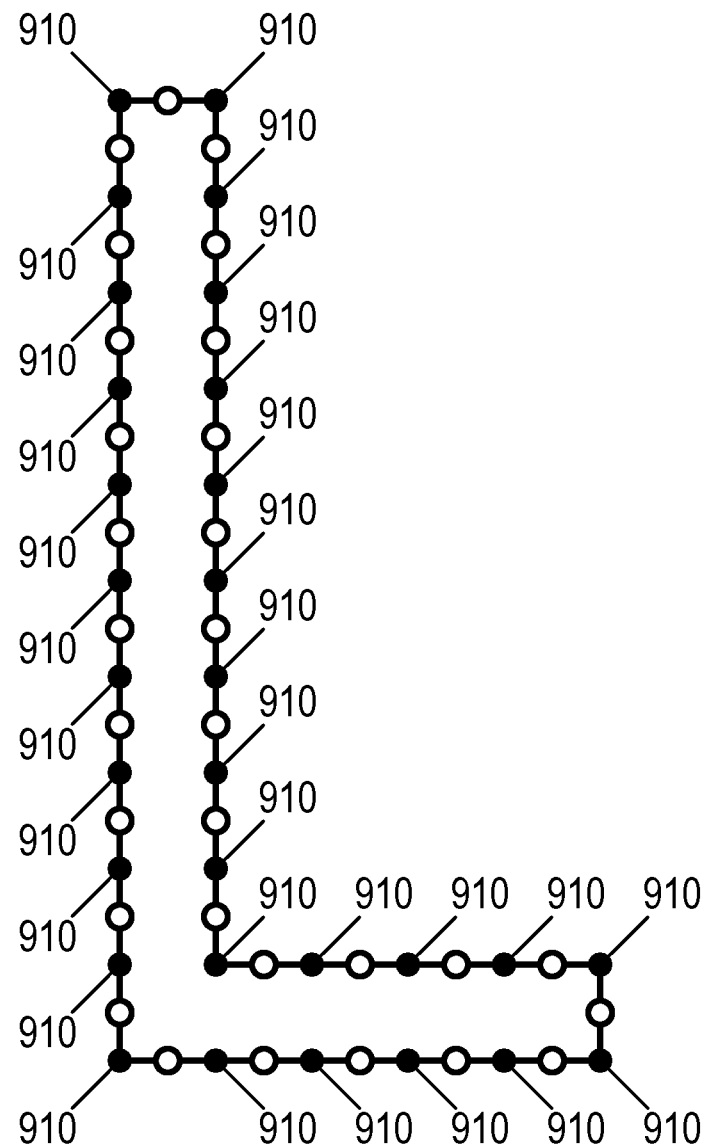
FIG. 9 shows the example glyph of FIG. 8, including glyph points of the glyph, according to some embodiments described herein.

For instance, FIG. 9 shows the example glyph 220 of FIG. 8, including glyph points 910, according to some embodiments described herein. The glyph 220 shown in FIG. 9 includes the same sub-segments 810 with the same anchor points 640 and control points 630 as in FIG. 8. The glyph 220 shown has thirty anchor points 640, some of which are shared by adjacent sub-segments but only counted once when determining glyph points 910. Thus, this glyph 220 has thirty glyph points 910 because each anchor point 640 is used as a glyph point 910 in this example. In some embodiments, the font animation system 100 treats each glyph point of a glyph 220 as a particle, or point mass, that can be moved based on application of an effect function associated with the animation effect being applied. Further, in some embodiments, the glyph points 910 can vary in their masses, such that not every glyph point 910 necessarily has the same mass, and thus the movements of glyph points 910 responsive to a common force can vary.

Generating Keyframes Based on Glyph Points

Figure 10:
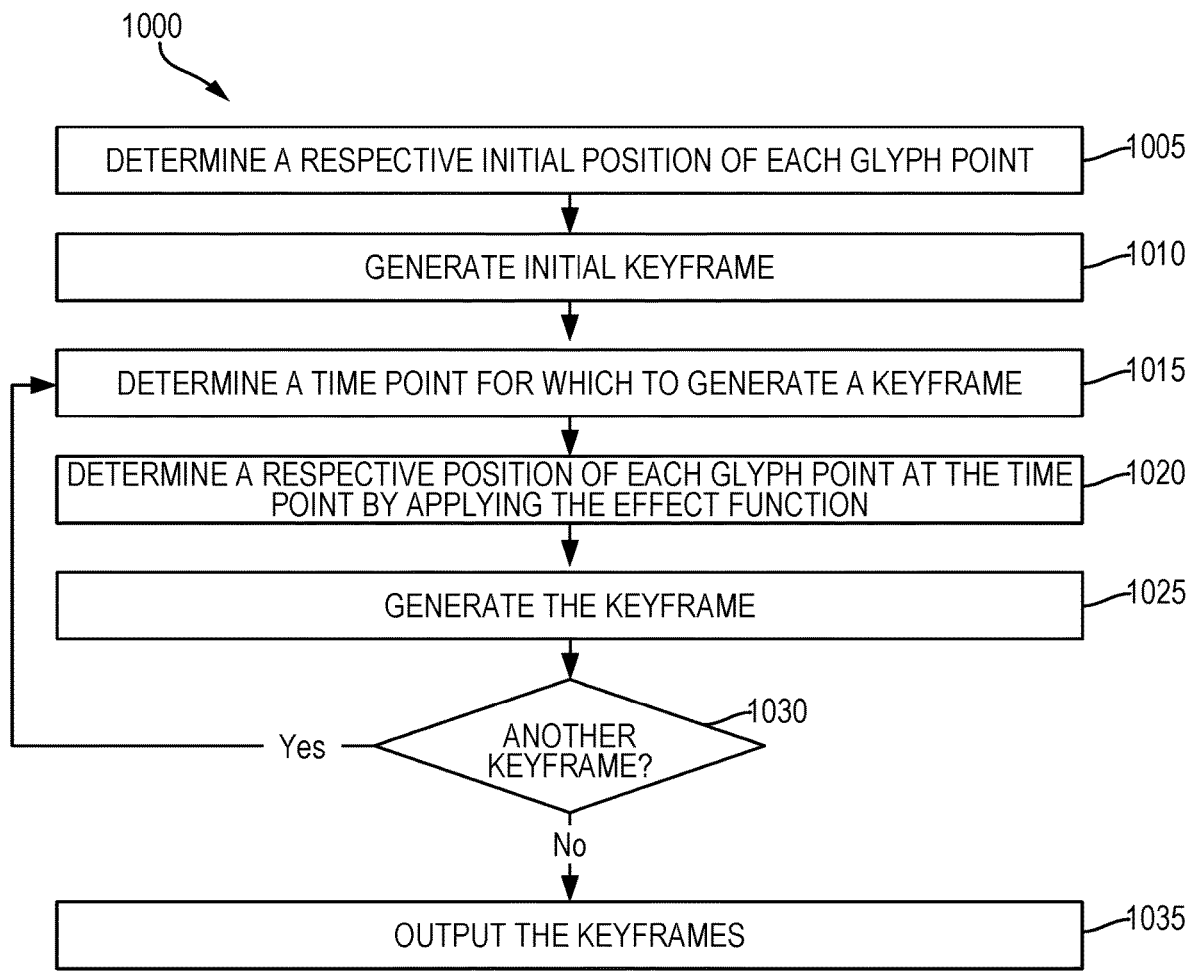
FIG. 10 is a diagram of a process of generating keyframes for the animation of a glyph based on the glyph points, according to some embodiments described herein.

FIG. 10 is a diagram of a process 1000 of generating keyframes for the animation of glyphs 220 (i.e., font animation) based on the glyph points 910, according to some embodiments described herein. As discussed above, in some embodiments, keyframes are based on the movements of glyph points 910 across various time points. Thus, given the glyph points 910 generated as described above for the glyphs 220 to be animated, the font animation system 100 generates the keyframes for the font animation.

The process 1000 depicted in FIG. 10, as well as the other processes described herein, may be implemented in software (e.g., code, instructions, or programs) executed by one or more processing units (e.g., processors or processor cores), in hardware, or combinations thereof. The software may be stored on a non-transitory storage medium, such as on a memory device. The process 1000 depicted in FIG. 10 and described below is intended to be illustrative and non-limiting. Although FIG. 10 depicts various activities occurring in a particular sequence or order, this is not intended to be limiting. In certain embodiments, for instance, the activities may be performed in a different order, or one or more activities of the process 1000 may be performed in parallel. In certain embodiments, such as in the embodiment depicted in FIG. 1, the process 1000 may be performed by the font animation system 100.

As shown in FIG. 10, at block 1005, the process 1000 involves determining a respective initial position of each glyph point. In some embodiments, the positions of the glyph points 910 were determined in the process 400 illustrated in FIG. 4 and described above for determining the glyph points 910. Thus, at block 1005, an embodiment of the font animation system 100 utilizes such positions as the initial positions of the glyph points 910.

At block 1010, the process 1000 involves generating an initial keyframe for the animation. In some embodiments, the initial keyframe provides starting positions for the various glyph points 910 in the font animation, such that later keyframes show the glyphs 220 being animated after movement of the glyph points 910. To generate the initial keyframe, an embodiment of the font animation system 100 draws a series of segments 510 for each glyph 220 being animated, where a segment 510 can be a curve segment. In some embodiments, as described above, the glyph points 910 are connected by sub-segments 810, because the glyph points 910 are the anchor points 640 of the sub-segments 810 determined as described above. Further, two glyph points 910 connected by such a sub-segment 810 are deemed adjacent. To generate the initial keyframe, an embodiment of the font animation system 100 generates segments 510 between each pair of adjacent glyph points 910. In the case of the initial keyframe, the segments 510 drawn correspond to the sub-segments determined above in some embodiments, because the positions used for the glyph points 910 have not yet changed.

As shown in FIG. 10, at block 1015, the process 1000 involves determining a time point for which to generate a keyframe other than the initial keyframe. In some embodiments, the font animation is being generated in real time, and in that case, the font animation system 100 can determine a time point by setting the time point equal to a current time since an initial time associated with the initial keyframe; for instance the current time can be a clock time less an initial clock time at which the user requested animation of the glyphs 220.

If the font animation is not being generated in real time, then an embodiment of the font animation system 100 can use various factors to determine a time point for a keyframe. For instance, in one example, the user selects a timespan T for the length of the animation, or the timespan T is set by default, such as based on settings of the font animation system 100 or based on previously set user preferences. In that case, the font animation system 100 determines the number of keyframes K needed based on dividing the timespan T by a desired number of keyframes per second R. Additionally or alternatively, other techniques exist and can be used for identifying time points for which to generate keyframes.

At block 1020, the process 1000 involves determining a respective position of each glyph point 910 at the time point determined at block 1015. In some embodiments, determining the position of a glyph point 910 involves applying the effect function, associated with the indicated animation effect, to the glyph point 910 and the time point. As described above, the animation effect being used is associated with metadata, such as an effect function. An example of an effect function maps a time point and an input position of a glyph point 910 to an output position, or updated position, of the glyph point 910. Thus, to apply the effect function, an embodiment of the font animation system 100 inputs the time point and a position of the glyph point 910 (i.e., the initial position of the glyph point 910 as determined at block 1005) and receives as output from the effect function an updated position of the glyph point 910 at the time point.

Generally, an example of an effect function is designed to simulate a physical event and, more specifically, how that physical event impacts the glyph points 910. In some embodiments, the font animation system 100 treats a glyph point 910 as a point mass, or a particle, having mass at the position of the glyph point 910. Thus, when a force is applied to a glyph point 910, an embodiment of the font animation system 100 moves the glyph point 910 according to the laws of physics, as if the glyph point 910 has mass. For example, in the case of a wind effect, the associated effect function is a force function (i.e., a function that applies a force) that moves the glyph points 910 to simulate a wind applied to the glyph points 910. For another example, in the case of a wave effect, the associated effect function is a force function that moves the glyph points 910 to simulate the movement of a wave, such as a water wave. However, in some embodiments, an effect function is not required to be a force function (i.e., is not required to simulate movement based on application of a force). For instance, as described in more detail below, an effect function can simulate grass growing, fire, melting, or other effects, such as through the use of a conditional effect function.

At block 1025, the process 1000 involves generating the keyframe associated with the time point. To generate the keyframe, an embodiment of the font animation system 100 draws a series of segments 510 for each glyph 220 being animated, where a segment 510 can be a curve segment. In some embodiments, as described above, the glyph points 910 are initially connected by sub-segments 810, because the glyph points 910 are the anchor points 640 of the sub-segments 810 determined as described above, and two glyph points 910 connected by such a sub-segment 810 are deemed adjacent. In some embodiments, adjacent glyph points 910 remain adjacent throughout the font animation (i.e., through the keyframes). Thus, to generate the keyframe, an embodiment of the font animation system 100 generates segments 510 between each pair of adjacent glyph points 910 regardless of the updated positions of the glyph points.

At decision block 1030, the process 1000 involves deciding whether to generate another keyframe. In one example, if the font animation is occurring in real time, an embodiment of the font animation system 100 decides to generate another keyframe if the user is still viewing or otherwise utilizing the font animation, and the font animation system 100 decides not to generate another keyframe is the user is no longer viewing or otherwise utilizing the font animation. In another example, if the font animation system 100 is not generating the font animation in real time, then the font animation system 100 could decide to generate another keyframe if the number of keyframes required for the desired timespan have not yet been generated, and the font animation system 100 could decide not to generate another keyframe is the keyframes required have all been generated.

In some embodiments, if the font animation system 1000 decides to generate another keyframe, then the process 1000 returns to block 1015 to determine a time point for another keyframe. However, if the font animation system 100 decides not to generate another keyframe, then the process 1000 proceeds to block 1035, where the generated keyframes are output for use in providing the font animation.

Figure 11:
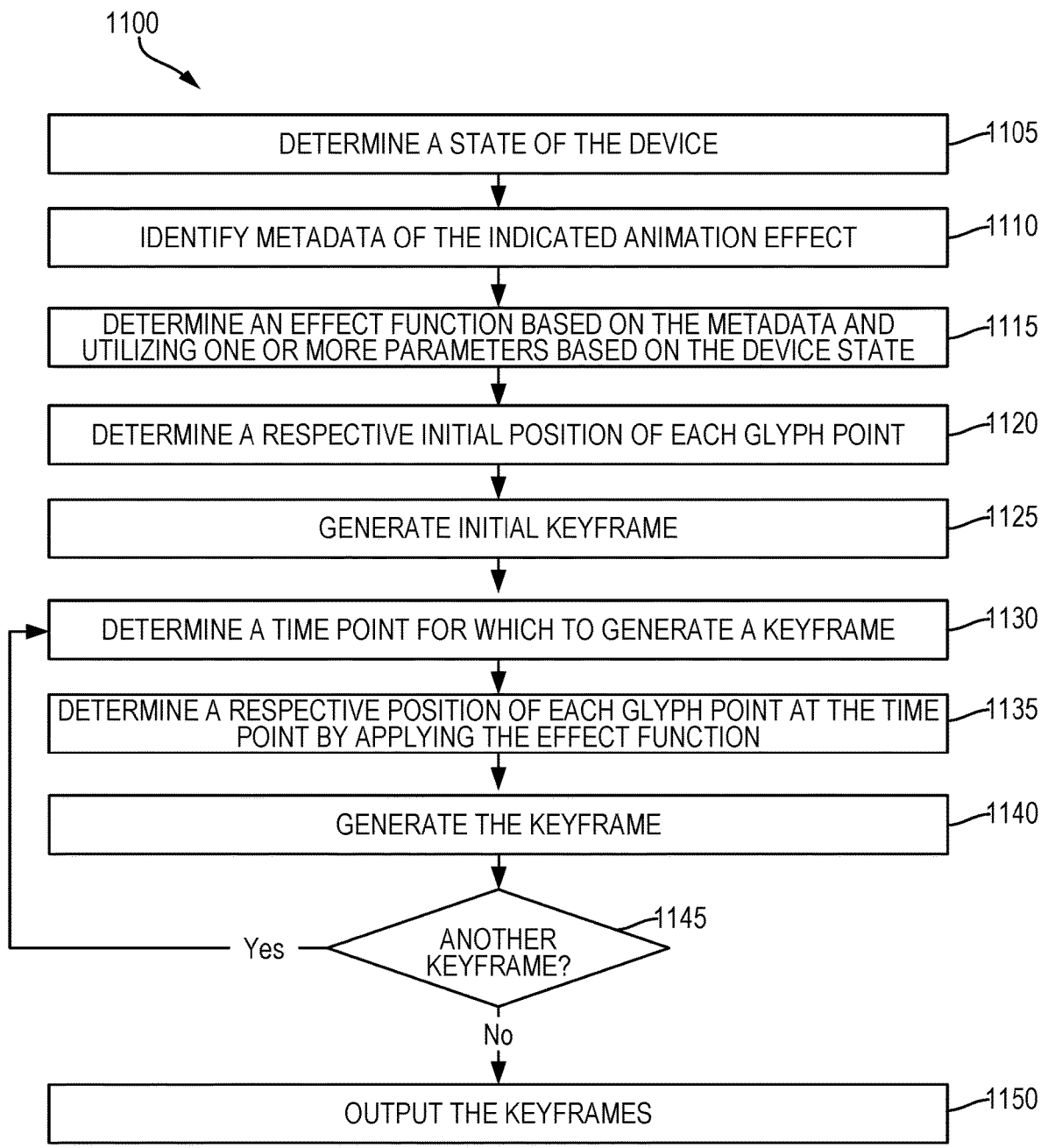
FIG. 11 is another diagram of a process of generating keyframes for the animation of a glyph based on the glyph points, according to some embodiments described herein.

FIG. 11 is another diagram of a process 1100 of generating keyframes for the animation of glyphs 220 based on the glyph points 910, according to some embodiments described herein. Given glyph points 910 of the glyphs 220 to be animated, an embodiment of the font animation system 100 utilizes this process 1100 as an alternative to, or in addition to, the process 1000 shown in FIG. 10. Specifically, this process 1100 incorporates a state of a device 130 when determining how the animation effect is applied to the glyph points 910. Thus, a user can move or orient the device 130 to impact the font animation; for instance, the user can move or orient the device to intuitively control the font animation.

The process 1100 depicted in FIG. 11, as well as the other processes described herein, may be implemented in software (e.g., code, instructions, or programs) executed by one or more processing units (e.g., processors or processor cores), in hardware, or combinations thereof. The software may be stored on a non-transitory storage medium, such as on a memory device. The process 1100 depicted in FIG. 11 and described below is intended to be illustrative and non-limiting. Although FIG. 11 depicts various activities occurring in a particular sequence or order, this is not intended to be limiting. In certain embodiments, for instance, the activities may be performed in a different order, or one or more activities of the process 1100 may be performed in parallel. In certain embodiments, such as in the embodiment depicted in FIG. 1, the process 1100 may be performed by the font animation system 100.

As shown in FIG. 11, at block 1105, the process 1100 includes determining a state of a device 130. In one example, the device 130 is a computing device, such as a consumer device, being utilized by a user who requests animation of the glyphs 220. In another example, the device 130 is remote from the user and is operated by someone else. As described above, and example of the device 130 includes one or more sensors 150 that can determine a device state. For example, the sensors 150 include one or more of an accelerometer, a gyroscope, a magnetometer, or a GPS device. The sensors can detect information about the device state, such as, for example, speed, acceleration (e.g., due to gravity or otherwise), vibration, and tilt, and as such, the device 130 can use the sensors 150 to determine movement and orientation in three dimensions. For instance, using the sensors 150, the device 130 can detect a speed and direction in which the device 130 is moving or the direction of gravity with respect to the device 130. In some embodiments, the font animation system 100 has access to the device state through, for instance, access to direct output from the sensors 150 or access to filtered or processed data from the device 130 based on output from the sensors 150.

Through the incorporation of device state into an animation effect, a user is able to customize a font animation based on the user's movement of the device 130. In some conventional systems, a user was required to identify points on the glyph and manually reposition those points as desired for the animation, and this was a time-intensive task and required an experience user. In contrast, some embodiments described herein enable a user to simply move the device 130 to customize how the animation effect is applied. For example, as the rate or direction of the velocity of the device 130 changes, the resulting font animation changes in real time, and a first font animation generated based on a first velocity of the device 130 differs from a second font animation generated based on a second velocity of the device 130 that differs from the first. Analogously, for example, when the device 130 experiences a change in force or orientation, the resulting font animation changes in real time, and a first font animation based on a first force or orientation can differ from a second font animation based on a second force or orientation. Thus, some implementations incorporate the device state into the font automation to enable varying results based on physical manipulation of the device 130 itself.

At block 1110, the process 1100 involves identifying metadata of the indicated animation effect. As described above, an embodiment of the font animation system 100 receives an indication of an animation effect to apply to a set of glyphs 220, and the animation effect is associated with metadata. Thus, the font animation system 100 accesses the metadata associated with the indicated animation effect.

At block 1115, the process 1100 involves determining an effect function that is based on the metadata and that utilizes one or more parameters based on the device state. For instance, the font animation system 100 can incorporate an aspect of the device state into one or more parameters of the effect function.

In one example, a user requests application of an animation effect that is a wave effect associated with metadata that includes the following effect function: $x(t)=x_0+\alpha \sin(y+t)+t^2$. To apply this effect function to generate a keyframe associated with a time point, $x_0$ is the x-coordinate of the initial position of a glyph point 910, y is the fixed y-coordinate of the glyph point 910, t is the time point, and x(t) is the updated position of the glyph point 910 at the time point and thus in the keyframe. Additionally, the variable a is a scalar that is positively correlated with the speed of movement of the device 130. Thus, if the device 130 moves quickly, then the wave effect is more pronounced, and if the device 130 moves more slowly, the wave effect is less pronounced. In another example, the animation effect is a fire effect that produces upward-extending flames only on segments 510 (e.g., sub-segments 810) of a glyph 220 that are upward facing. More details of such an animation effect will be described in more detail below. However, in this case, the device state indicates a direction of gravity and thus determines which segments 510 are modified with simulated fire. For instance, to achieve this, the effect function for the fire effect is conditional such that the addition of flames is applied only to segments 510 that are deemed to face upward. Analogously, another example of an animation effect is a melting effect, in which melting aspects are added to the bottom of downward-facing segments 510. The device state indicates a direction of gravity and thus determines which segments 510 are modified with simulated melting. For instance, to achieve this, the effect function for the melting effect is conditional such that the addition of melting is applied only to segments 510 that are deemed to face downward. In yet another example, an animation effect can be a cloth effect, which simulates the movement of a cloth hanging from a line and moving in the wind. Thus, the top of the glyphs 220 remain fixed, while movement is magnified the farther from the top a glyph point 910 is. The associated effect function could determine an x-coordinate of a glyph point based on the distance from the top in the y-direction. To incorporate the device state, for instance, the sinusoidal function can be magnified by a scalar that is based on the device state, such as on the speed of movement of the device in the horizontal direction.

At block 1120, the process 1100 involves determining a respective initial position of each glyph point. In some embodiments, the positions of the glyph points 910 were determined in the process 400 illustrated in FIG. 4 and described above for determining the glyph points 910. Thus, at block 1120, an embodiment of the font animation system 100 utilizes such positions as the initial positions of the glyph points 910.

At block 1125, the process 1100 involves generating an initial keyframe for the animation. In some embodiments, the initial keyframe provides starting positions for the various glyph points 910 in the font animation, such that later keyframes show the glyphs 220 being animated after movement of the glyph points 910. To generate the initial keyframe, an embodiment of the font animation system 100 draws a series of segments 510 for each glyph 220 being animated, where a segment 510 can be a curve segment. In some embodiments, as described above, the glyph points 910 are connected by sub-segments 810, because the glyph points 910 are the anchor points 640 of the sub-segments 810 determined as described above. Further, two glyph points 910 connected by such a sub-segment 810 are deemed adjacent. To generate the initial keyframe, an embodiment of the font animation system 100 generates segments 510 between each pair of adjacent glyph points 910. In the case of the initial keyframe, the segments 510 drawn correspond to the sub-segments determined above in some embodiments, because the positions used for the glyph points 910 have not yet changed.

At block 1130, the process 1100 involves determining a time point for which to generate a keyframe other than the initial keyframe. In some embodiments, the font animation is being generated in real time, and in that case, the font animation system 100 can determine a time point by setting the time point equal to a current time since an initial time associated with the initial keyframe; for instance the current time can be a clock time less an initial clock time at which the user requested animation of the glyphs 220.

If the font animation is not being generated in real time, then an embodiment of the font animation system 100 can use various factors to determine a time point for a keyframe. For instance, in one example, the user selects a timespan T for the length of the animation, or the timespan T is set by default, such as based on settings of the font animation system 100 or based on previously set user preferences. In that case, the font animation system 100 determines the number of keyframes K needed based on dividing the timespan T by a desired number of keyframes per second R. Additionally or alternatively, other techniques exist and can be used for identifying time points for which to generate keyframes.

At block 1135, the process 1100 involves determining a respective position of each glyph point 910 at the time point determined at block 1130. In some embodiments, determining the position of a glyph point 910 involves applying the effect function determined at block 1115, based on the device state, to the glyph point 910 and the time point. To apply the effect function, an embodiment of the font animation system 100 inputs the time point and a position of the glyph point 910 (i.e., the initial position of the glyph point 910 as determined at block 1120) and receives as output from the effect function an updated position of the glyph point 910 at the time point.

At block 1140, the process 1100 involves generating the keyframe associated with the time point. To generate the keyframe, an embodiment of the font animation system 100 draws a series of segments 510 for each glyph 220 being animated, where a segment 510 can be a curve segment. In some embodiments, as described above, the glyph points 910 are initially connected by sub-segments 810, because the glyph points 910 are the anchor points 640 of the sub-segments 810 determined as described above, and two glyph points 910 connected by such a sub-segment 810 are deemed adjacent. In some embodiments, adjacent glyph points 910 remain adjacent throughout the font animation (i.e., through the keyframes). Thus, to generate the keyframe, an embodiment of the font animation system 100 generates segments 510 between each pair of adjacent glyph points 910 regardless of the updated positions of the glyph points.

At decision block 1145, the process 1100 involves deciding whether to generate another keyframe. In one example, if the font animation is occurring in real time, an embodiment of the font animation system 100 decides to generate another keyframe if the user is still viewing or otherwise utilizing the font animation, and the font animation system 100 decides not to generate another keyframe is the user is no longer viewing or otherwise utilizing the font animation. In another example, if the font animation system 100 is not generating the font animation in real time, then the font animation system 100 could decide to generate another keyframe if the number of keyframes required for the desired timespan have not yet been generated, and the font animation system 100 could decide not to generate another keyframe is the keyframes required have all been generated.

In some embodiments, if the font animation system 1000 decides to generate another keyframe, then the process 1100 returns to block 1130 to determine a time point for another keyframe. However, if the font animation system 100 decides not to generate another keyframe, then the process 1100 proceeds to block 1150, where the generated keyframes are output for use in providing the font animation.

Example Animation Effects Based on Movements of Glyph Points

Returning to the example of FIG. 2, as mentioned previously, this figure shows an example of keyframes at three times, or time points, specifically $T_1$, $T_2$, and $T_3$. These keyframes are respectively referred to as the first keyframe 210*a*, the second keyframe 210*b*, and the third keyframe 210*c*; however, it will be understood that a font animation can have more or fewer keyframes. In this example, four glyphs 220, specifically glyphs 220 of the letters T, E, X, and T in a specific font were typed by a user or otherwise input into the font animation system 100. Together, the glyphs 220 form the word TEXT. The user requests that an animation effect, specifically a wave effect, be applied to the glyphs 220 to provide an animation. Responsive to this request, an example of the font animation system 100 generates the first keyframe 210*a* based on the initial appearance of the glyphs 220. The font animation system 100 generates additional keyframes, including the second keyframe 210*b* and the third keyframe 210*c*, based on movements of glyph points 910 identified for the glyphs 220 based on an effect function associated with the wave effect.

Specifically, in this example, the effect function associated with the wave effect is a sinusoidal function such as $x(t)=x_0+t^2 \sin(y+t)$, where $x(t)$ is the position of a glyph point 910 at a given time point t, where that glyph point 910 has an initial x-position of $x_0$ (i.e., at time point t=0), and where y is the y-position of the glyph point 910 in the prior keyframe. In this example, the y-position of each glyph point 910 is fixed over time because the effect function does not update the y-positions. The first keyframe 210*a* shows the glyphs 220 at an initial time, such as when the time point t=0, while the second keyframe 210*b* and the third keyframe 210*c* show the glyphs 220 at later time points after the glyph points 910 have been repositioned according to the effect function. When combined together, the keyframes can be used as the basis of a font animation that shows a wave effect applied to the glyphs 220.

Figure 12:
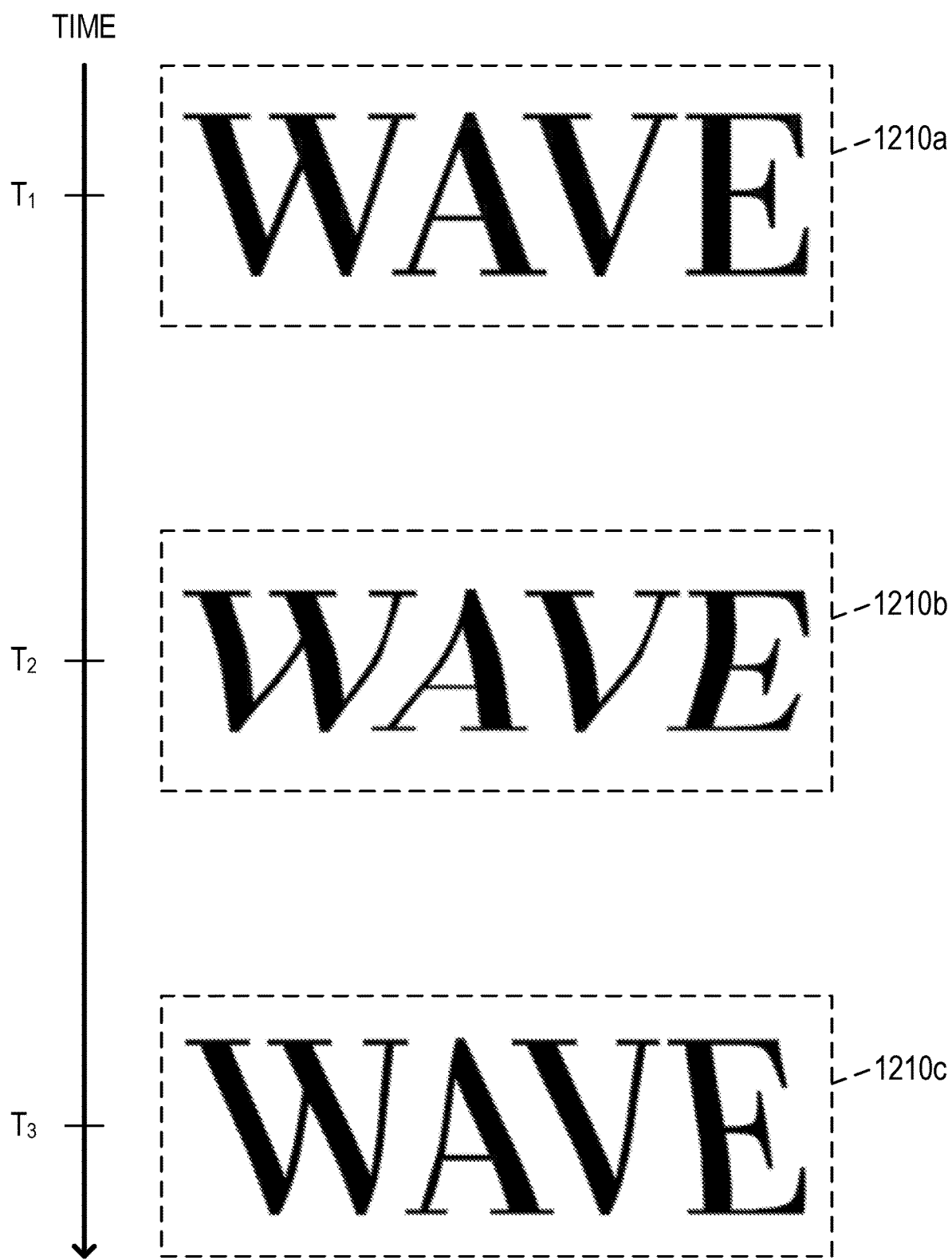
FIG. 12 shows an example of keyframes generated to provide a font animation based on a wave effect, according to some embodiments described herein.

FIG. 12 shows another example of keyframes generated by the font animation system 100 to provide a font animation based on a wave effect, according to some embodiments described herein. Specifically, FIG. 12 shows keyframes at three times, or time points, specifically $T_1$, $T_2$, and $T_3$. These keyframes are respectively referred to as the first keyframe 1210*a*, the second keyframe 1210*b*, and the third keyframe 1210*c*; however, it will be understood that a font animation can have more or fewer keyframes. In this example, four glyphs 220, specifically glyphs 220 of the letters W, A, V, and E in a specific font were typed by a user or otherwise input into the font animation system 100. Together, the glyphs 220 form the word WAVE. The user requests that an animation effect, specifically a wave effect, be applied to the glyphs 220 to provide a font animation. Responsive to this request, an example of the font animation system 100 generates the first keyframe 1210*a* based on the initial appearance of the glyphs 220. The font animation system 100 generates additional keyframes, including the second keyframe 1210*b* and the third keyframe 1210*c*, based on movements of glyph points 910 identified for the glyphs 220 based on an effect function associated with the wave effect.

Specifically, in this example, no force is applied on the glyph points 910 by the effect function, but each glyph point has a velocity as a function of time as follows:

$$v(t) = \sin\left(\frac{y-B}{H}+t\right)$$

In the above, B is the y-position of the bottom of the glyph 220, and H is the height of the glyph 220. As such, the effect function associated with the wave effect is a sinusoidal function in both the x-direction and the y-direction as follows:

$$x(t) = x_0 + t\sin\left(\frac{y-B}{H}+t\right)$$
$$y(t) = y_0 + t\sin\left(\frac{y-B}{H}+t\right)$$

In the above, $y(t)$ is the position of a glyph point 910 at a given time point t, where that glyph point 910 has an initial y-position of $y_0$ (i.e., at time point t=0). This example illustrates that, in some embodiments, it is not necessary for the glyph points 910 to be treated as having mass; rather, as in the example of FIG. 12, a glyph point 910 can be given a velocity rather than being moved by a force. The first keyframe 1210*a* shows the glyphs 220 at an initial time, such as when the time point t=0, while the second keyframe 1210*b* and the third keyframe 1210*c* show the glyphs 220 at later time points after the glyph points 910 have been repositioned according to the effect function.

Figure 13:
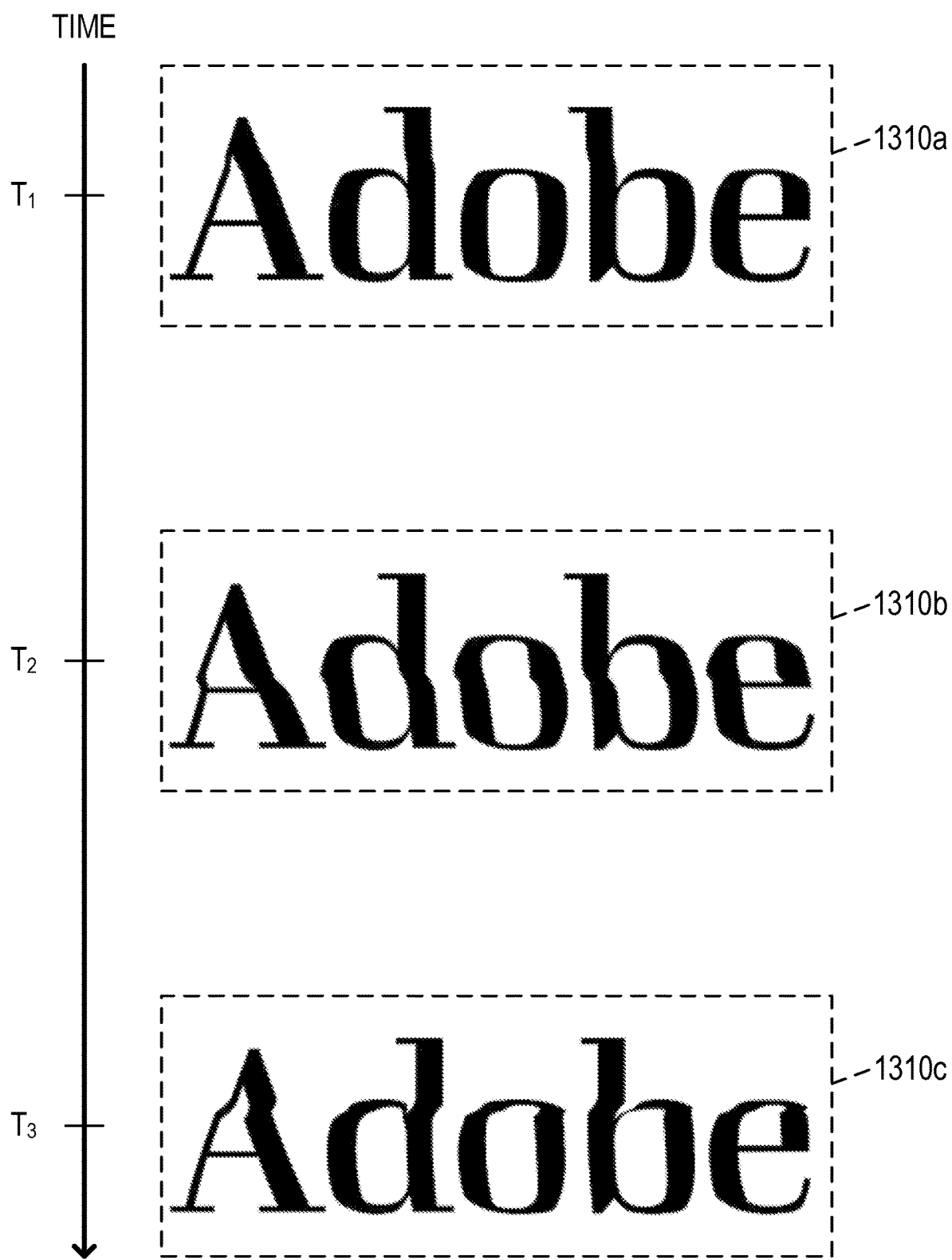
FIG. 13 shows another example of keyframes generated to provide a font animation based on a wave effect, according to some embodiments described herein.

FIG. 13 shows yet another example of keyframes generated by the font animation system 100 to provide a font animation based on a wave effect, according to some embodiments described herein. Specifically, FIG. 13 shows keyframes at three times, or time points, specifically $T_1$, $T_2$, and $T_3$. These keyframes are respectively referred to as the first keyframe 1310*a*, the second keyframe 1310*b*, and the third keyframe 1310*c*; however, it will be understood that a font animation can have more or fewer keyframes. In this example, five glyphs 220, specifically glyphs 220 of the letters A, d, o, b, and e in a specific font were typed by a user or otherwise input into the font animation system 100. Together, the glyphs 220 form the word Adobe. The user requests that an animation effect, specifically a wave effect, be applied to the glyphs 220 to provide a font animation. Responsive to this request, an example of the font animation system 100 generates the first keyframe 1310*a* based on the initial appearance of the glyphs 220. The font animation system 100 generates additional keyframes, including the second keyframe 1310*b* and the third keyframe 1310*c*, based on movements of glyph points 910 identified for the glyphs 220 based on an effect function associated with the wave effect.

Specifically, in this example, the wave effect forms a wave only with respect to points that lie within a specific range of y-positions, such that only certain glyph points 910 move in a manner that simulates a wave while other glyph points 910 remain stationary. As such, the effect function is conditional. For instance, this example of a wave effect is associated with the following effect function:

$$\text{if } 0.25 < \frac{y-B}{H} < 0.75, \text{ then } x(t) = x_0 + t^2\sin(y+t) \text{ else } x(t) = x_0$$

In this example, the first keyframe 1310*a* shows the glyphs 220 at an initial time, such as when the time point t is close to 0, while the second keyframe 1310*b* and the third keyframe 1310*c* show the glyphs 220 at later time points after the glyph points 910 have been repositioned according to the effect function.

Figure 14:
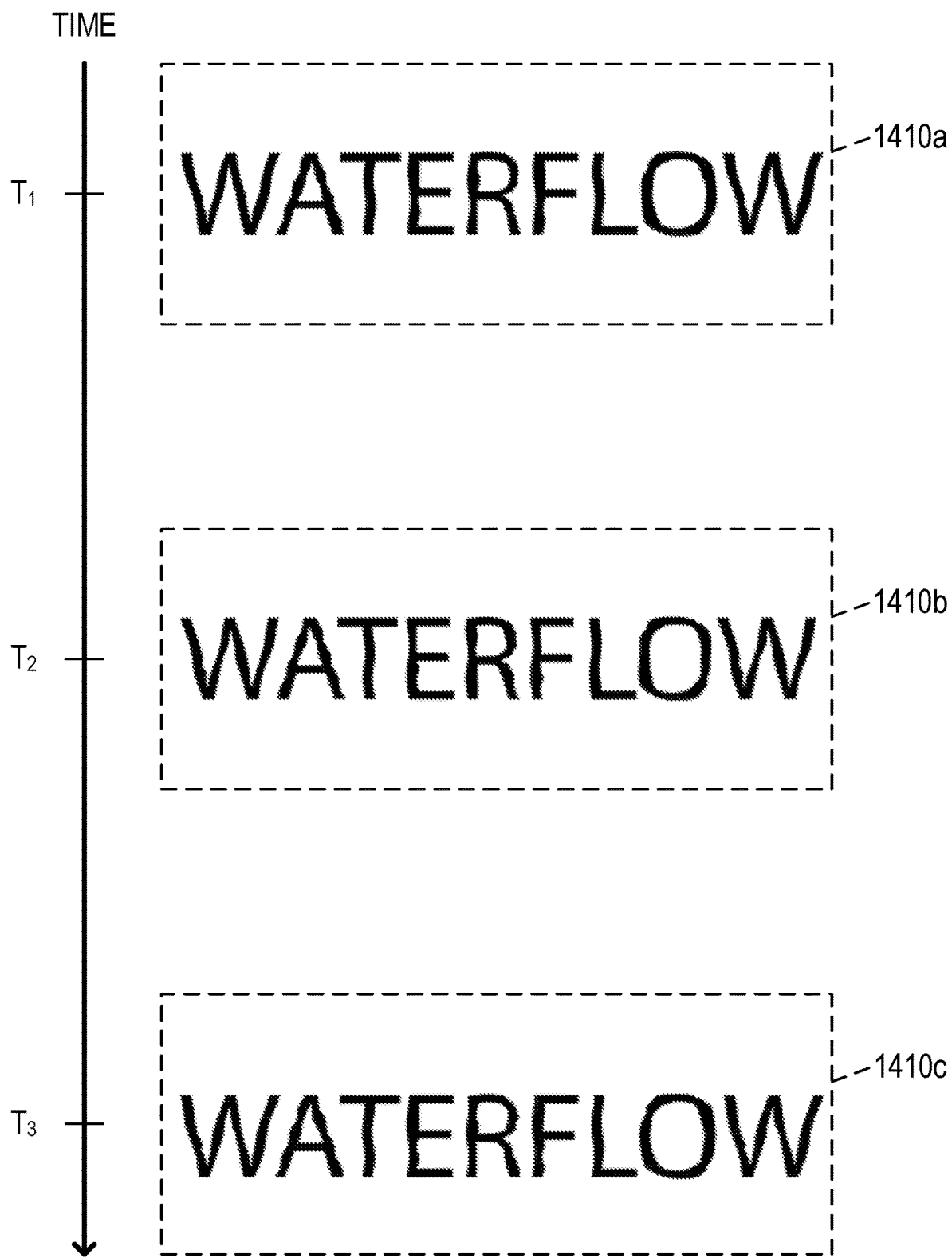
FIG. 14 shows an example of keyframes generated to provide a font animation based on a water flow effect, according to some embodiments described herein.

FIG. 14 shows an example of keyframes generated by the font animation system 100 to provide a font animation based on a water flow effect, according to some embodiments described herein. Specifically, FIG. 14 shows keyframes at three times, or time points, specifically $T_1$, $T_2$, and $T_3$. These keyframes are respectively referred to as the first keyframe 1410*a*, the second keyframe 1410*b*, and the third keyframe 1410*c*; however, it will be understood that a font animation can have more or fewer keyframes. In this example, nine glyphs 220, specifically glyphs 220 of the letters W, A, T, E, R, F, L, O, and W in a specific font were typed by a user or otherwise input into the font animation system 100. Together, the glyphs 220 form the word WATERFLOW. The user requests that an animation effect, specifically a water flow effect, be applied to the glyphs 220 to provide a font animation. Responsive to this request, an example of the font animation system 100 generates the first keyframe 1410*a* based on the initial appearance of the glyphs 220. The font animation system 100 generates additional keyframes, including the second keyframe 1410*b* and the third keyframe 1410*c*, based on movements of glyph points 910 identified for the glyphs 220 based on an effect function associated with the water flow effect.

Specifically, in this example, the water flow effect is associated with the following effect function, in which k is a constant:

$$x(t) = k\ \sin(y+t)$$

Given this effect function, the x-position of each glyph point 910 oscillates between the values of –k and +k due to the use of the sin function. In this example, the first keyframe 1410*a* shows the glyphs 220 at an initial time, such as when the time point t=0, while the second keyframe 1410*b* and the third keyframe 1410*c* show the glyphs 220 at later time points after the glyph points 910 have been repositioned according to the effect function.

Figure 15:
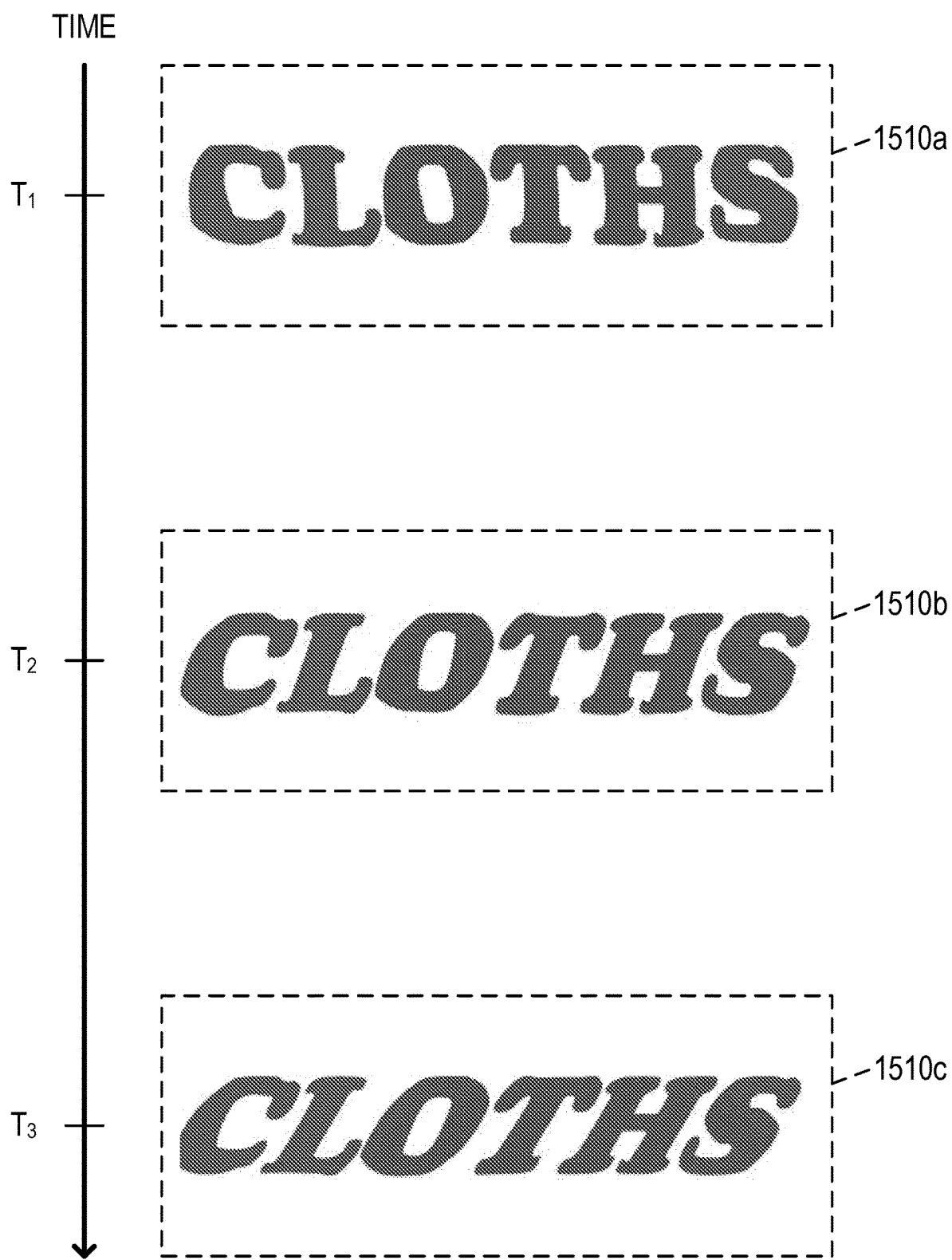
FIG. 15 shows an example of keyframes generated to provide a font animation based on a cloth effect, according to some embodiments described herein.

FIG. 15 shows an example of keyframes generated by the font animation system 100 to provide a font animation based on a cloth effect, according to some embodiments described herein. Specifically, FIG. 15 shows keyframes at three times, or time points, specifically $T_1$, $T_2$, and $T_3$. These keyframes are respectively referred to as the first keyframe 1510*a*, the second keyframe 1510*b*, and the third keyframe 1510*c*; however, it will be understood that a font animation can have more or fewer keyframes. In this example, six glyphs 220, specifically glyphs 220 of the letters C, L, O, T, H, and S in a specific font were typed by a user or otherwise input into the font animation system 100. Together, the glyphs 220 form the word CLOTHS. The user requests that an animation effect, specifically a cloth effect, be applied to the glyphs 220 to provide a font animation. Responsive to this request, an example of the font animation system 100 generates the first keyframe 1510*a* based on the initial appearance of the glyphs 220. The font animation system 100 generates additional keyframes, including the second keyframe 1510*b* and the third keyframe 1510*c*, based on movements of glyph points 910 identified for the glyphs 220 based on an effect function associated with the cloth effect.

Specifically, in this example, the cloth effect is associated with the following effect function, in which gravityX is the slant angle in degrees in the x direction, which is an angle describing the direction of gravity relative to the device 130 as determined by the device 130; GlyphBoxXMin is the minimum x-value of the glyph bounding box of the glyph being animated; GlyphBoxXMax is the maximum x-value of the glyph bounding box of the glyph being animated; and W is the width of the glyph bounding box.

$$angleRadian = \left(\frac{\pi}{2}\right) - gravityX \times \left(\frac{\pi}{180}\right)$$

$$x(t) = x_0 + k \times \sin\left(\frac{y - T}{H} + t\right) \times (t) + \frac{y - T}{\tan(angleRadian)}$$

$$xDiff1 = x - GlyphBoxXMin$$

$$xDiff2 = GlyphBoxXMin - x$$

$$xDiff = \min(xDiff1, xDiff2)$$

$$y(t) = y_0 + k \times \sin\left(\frac{xDiff}{W} + t\right) \times (t)$$

In this example, the first keyframe 1510*a* shows the glyphs 220 at an initial time, such as when the time point t=0, while the second keyframe 1510*b* and the third keyframe 1510*c* show the glyphs 220 at later time points after the glyph points 910 have been repositioned according to the effect function.

Figure 16:
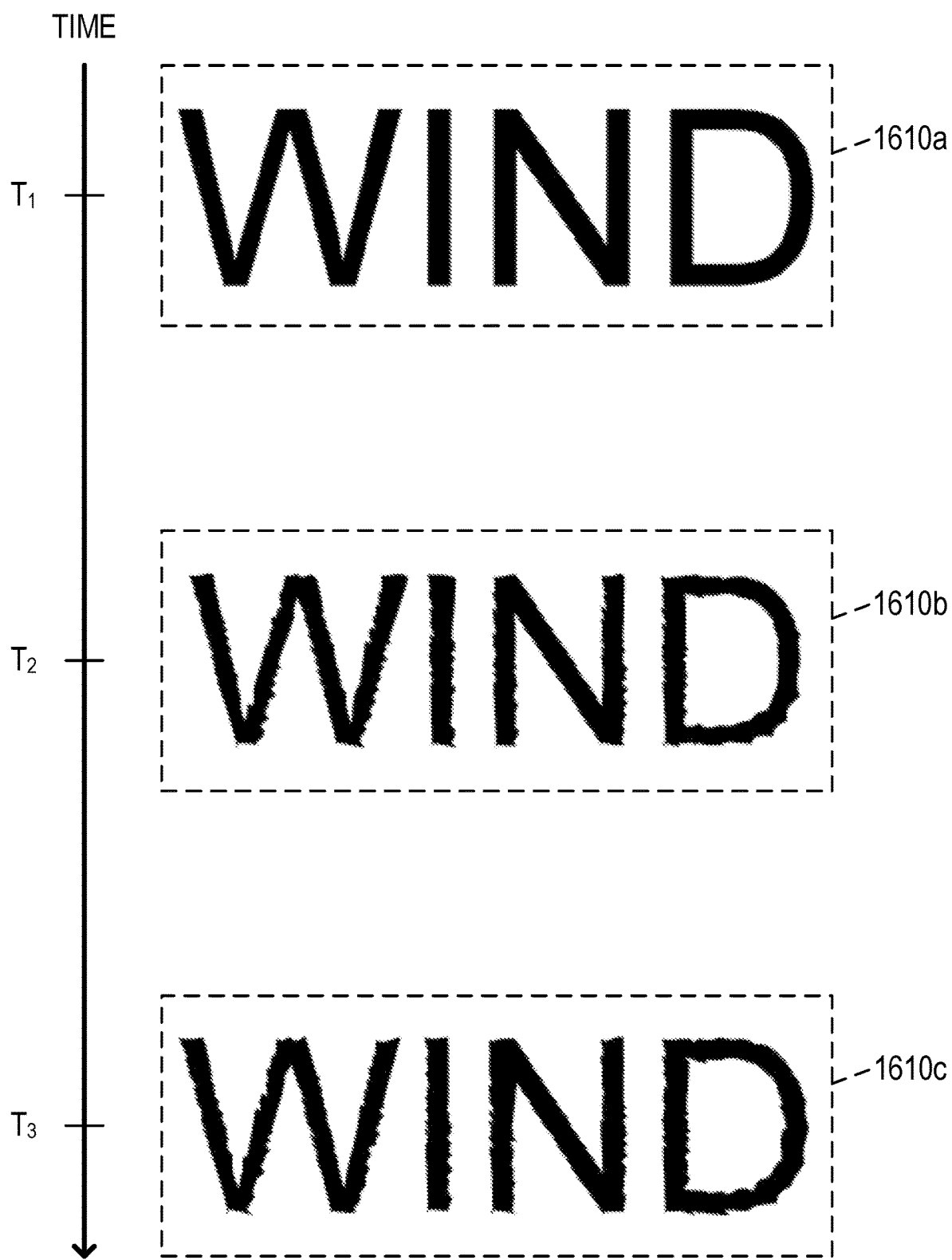
FIG. 16 shows an example of keyframes generated to provide a font animation based on a wind effect, according to some embodiments described herein.

FIG. 16 shows an example of keyframes generated by the font animation system 100 to provide a font animation based on a wind effect, according to some embodiments described herein. Specifically, FIG. 16 shows keyframes at three times, or time points, specifically $T_1$, $T_2$, and $T_3$. These keyframes are respectively referred to as the first keyframe 1610*a*, the second keyframe 1610*b*, and the third keyframe 1610*c*; however, it will be understood that a font animation can have more or fewer keyframes. In this example, four glyphs 220, specifically glyphs 220 of the letters W, I, N, and D in a specific font were typed by a user or otherwise input into the font animation system 100. Together, the glyphs 220 form the word WIND. The user requests that an animation effect, specifically a wind effect, be applied to the glyphs 220 to provide a font animation. Responsive to this request, an example of the font animation system 100 generates the first keyframe 1610*a* based on the initial appearance of the glyphs 220. The font animation system 100 generates additional keyframes, including the second keyframe 1610*b* and the third keyframe 1610*c*, based on movements of glyph points 910 identified for the glyphs 220 based on an effect function associated with the wind effect.

Specifically, in this example, the glyph points 910 include both the anchor points 640 of the sub-segments 810 identified as described above as well as the control points 630 of those sub-segments 810. The wind effect is associated with the following effect function, which is applied to the glyph points 910:

$$x(t) = x_0 + \text{delta} \times w_x$$

$$y(t) = y_0 + \text{delta} \times w_y$$

In the above, $w_x$ is a simulated wind speed in the x-direction, and $w_y$ is the simulated wind speed in the y-direction. For instance, the simulated wind speed could be based on the device state (e.g., a function of the velocity of the device 130), or the simulated wind speed could be a default value or could be selected by a user. Additionally, delta is a capped random number, such as a random value between 0 and 10, and $x_0$ and $y_0$ are the respective initial x- and y-positions of the glyph point 910. In this example, the first keyframe 1610a shows the glyphs 220 at an initial time, such as when the time point t=0, while the second keyframe 1610b and the third keyframe 1610c show the glyphs 220 at later time points after the glyph points 910 have been repositioned according to the effect function.

Example Animation Effects Based on Other Segment Modification

Figure 17:
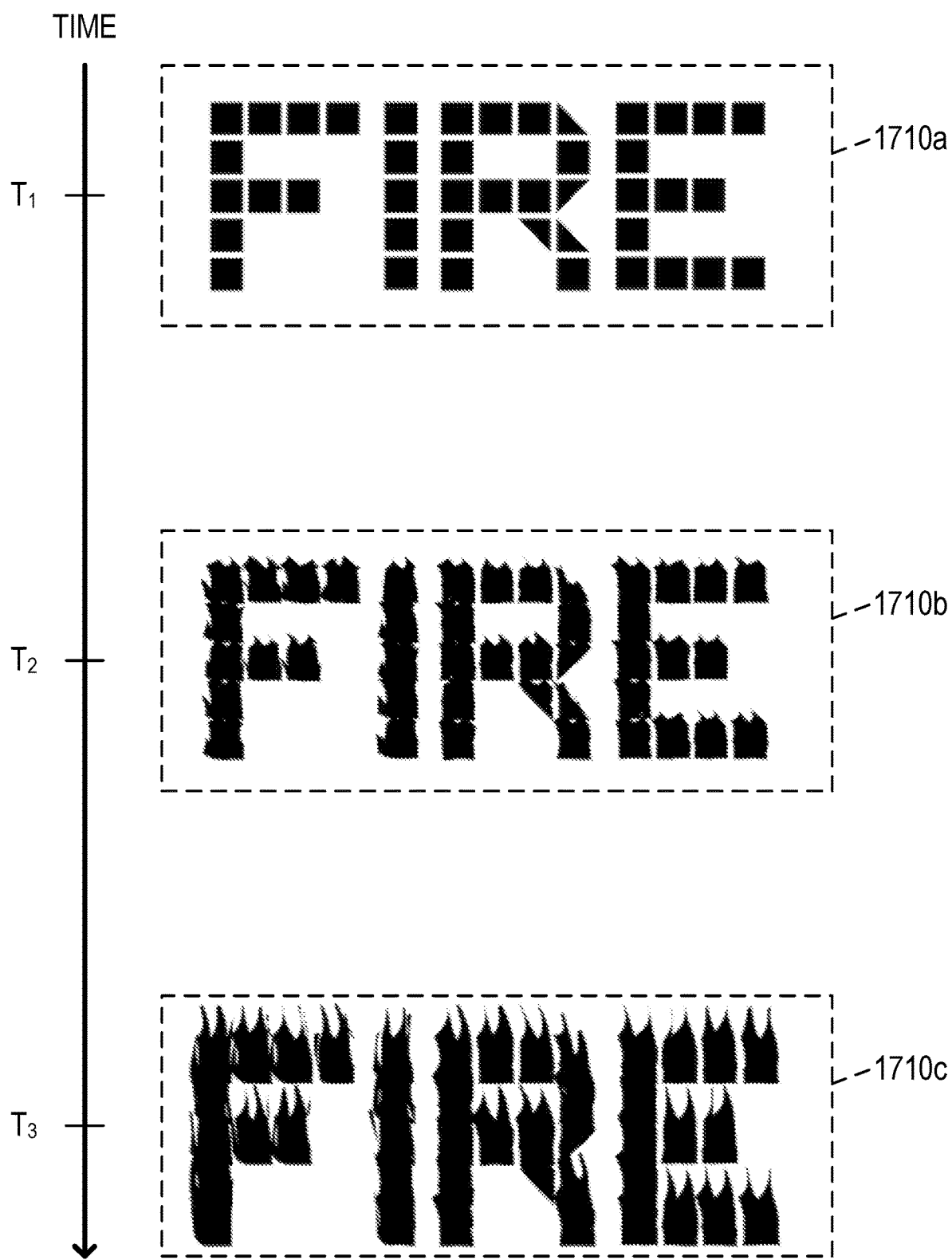
FIG. 17 shows an example of keyframes generated to provide a font animation based on a fire effect, according to some embodiments described herein.

FIG. 17 shows an example of keyframes generated by the font animation system 100 to provide a font animation based on a fire effect, according to some embodiments described herein. Specifically, FIG. 17 shows keyframes at three times, or time points, specifically $T_1$, $T_2$, and $T_3$. These keyframes are respectively referred to as the first keyframe 1710a, the second keyframe 1710b, and the third keyframe 1710c; however, it will be understood that a font animation can have more or fewer keyframes. In this example, four glyphs 220, specifically glyphs 220 of the letters F, I, R, and E in a specific font were typed by a user or otherwise input into the font animation system 100. Together, the glyphs 220 form the word FIRE. The user requests that an animation effect, specifically a fire effect, be applied to the glyphs 220 to provide a font animation. Responsive to this request, an example of the font animation system 100 generates the first keyframe 1710a based on the initial appearance of the glyphs 220. The font animation system 100 generates additional keyframes, including the second keyframe 1710b and the third keyframe 1710c, based on movements of glyph points 910 identified for the glyphs 220 based on an effect function associated with the fire effect.

Fire results from a chemical reaction called combustion, which produces flames. An embodiment of the font animation system 100 constructs realistic-looking flames that grow and change over time and does so potentially without user interaction to determine how and where the flames are placed or how the flames move. In some embodiments, the font animation system 100 provides the fire effect across all segments 510 (e.g., all sub-segments 810) of a glyph 220. Alternatively, however, an embodiment provides the animation effect to segments 510 selectively such that, for instance, flames appear only on upward-facing segments 510 of the glyph 220. Regardless of whether all segments 510 or only a proper subset of segments 510 are modified by the fire effect, however, the size of the segments 510 can determine the thickness or length of the resulting flames.

Figure 18:
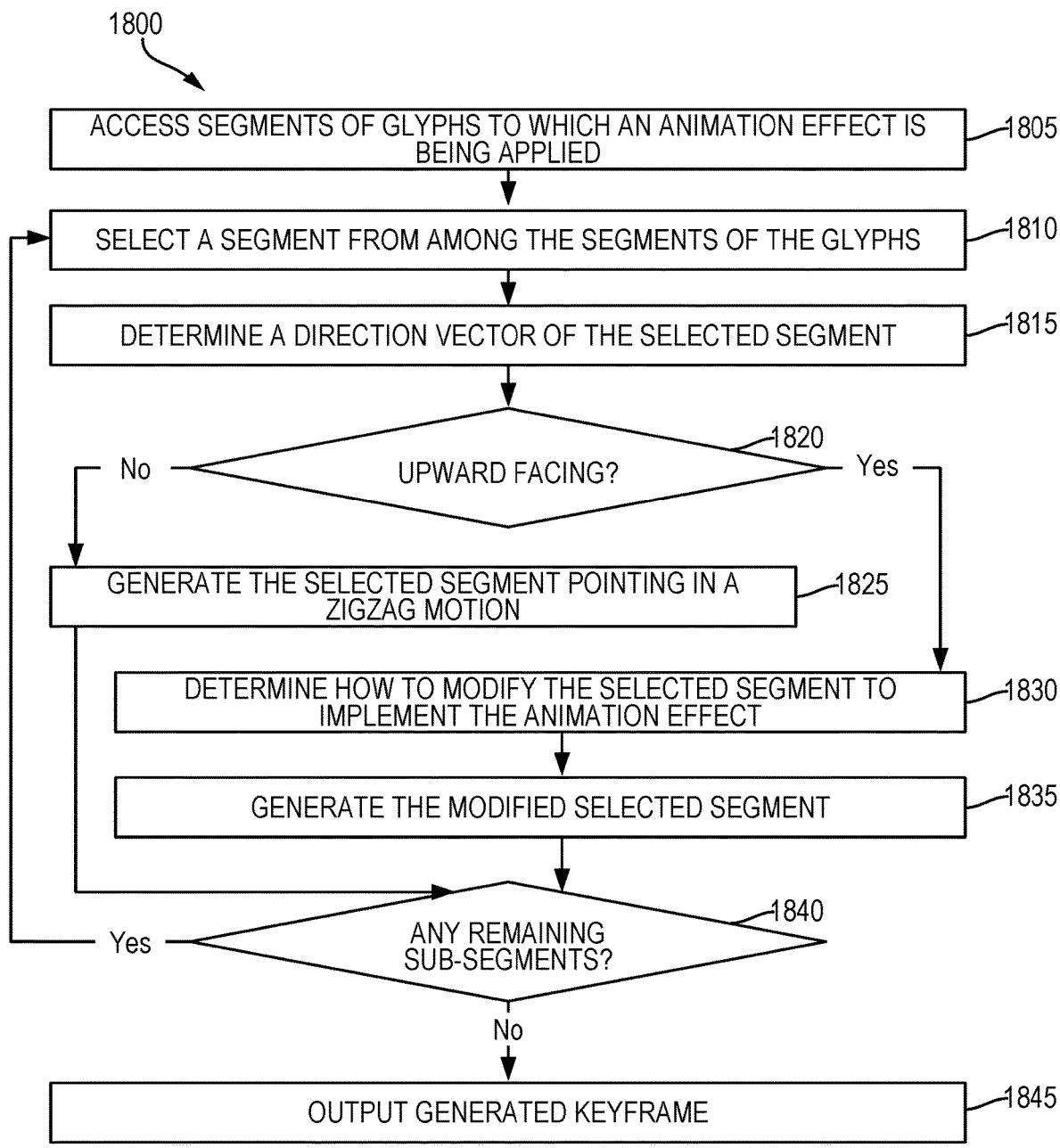
FIG. 18 is a diagram of a process of generating keyframes using a fire effect or other upward animation effect, according to some embodiments described herein.

FIG. 18 is a diagram of a process 1800 of generating keyframes of a font animation using a fire effect or other upward animation effect (i.e., an animation effect that impacts only upward-facing segments 510), according to some embodiments described herein. An embodiment of the font animation system 100 can perform this process 1800 when generating a keyframe in an instance where the font animation system 100 is applying the fire effect or another upward-facing effect. For instance, the font animation system 100 can perform this process 1800 or similar at block 315 of the process 300 of FIG. 3 for each keyframe, at block 1010 or block 1025 of the process 1000 of FIG. 10, at block 1125 or block 1140 of the process 1100 of FIG. 3, or elsewhere as needed. In some embodiments, prior to operation of this process 1800, the font animation system 100 has identified segments 510 of the glyphs 220 to be animated.

The process 1800 depicted in FIG. 18, as well as the other processes described herein, may be implemented in software (e.g., code, instructions, or programs) executed by one or more processing units (e.g., processors or processor cores), in hardware, or combinations thereof. The software may be stored on a non-transitory storage medium, such as on a memory device. The process 1800 depicted in FIG. 18 and described below is intended to be illustrative and non-limiting. Although FIG. 18 depicts various activities occurring in a particular sequence or order, this is not intended to be limiting. In certain embodiments, for instance, the activities may be performed in a different order, or one or more activities of the process 1800 may be performed in parallel. In certain embodiments, such as in the embodiment depicted in FIG. 1, the process 1800 may be performed by the font animation system 100.

As shown in FIG. 18, at block 1805, the process 1800 involves accessing segments 510 of glyphs 220 to which the animation effect (e.g., the fire effect or other upward animation effect) is to be applied. In some embodiments, the segments 510 include sub-segments 810 determined from larger segments 510. For instance, an example of the font animation system 100 determined the segments 510, which are sub-segments, using the process 400 of FIG. 4 or similar.

At block 1810, the process 1800 involves selecting a segment 510 from among the segments 510 accessed at block 1805, where the selected segment 510 has not yet been considered in a loop iteration. The selected segment 510 is defined by the ordered set $(P_1, P_2, P_3)$, where $P_1$ is a first anchor point 640, $P_2$ is a control point 630, and $P_3$ is a second anchor point 640. An embodiment of the font animation system 100 loops over the various segments 510, determining for each segment 510 in turn whether to modify the segment 510 based on the animation effect.

At block 1815, the process 1800 involves determining a direction, or direction vector, of the selected segment 510 that was selected at block 1810. For instance, an embodiment of the font animation system 100 determines a direction of the selected segment 510 by subtracting $P_3-P_1$, where the resulting direction vector describes the direction of the selected segment 510. However, it will be understood that other techniques are useable to determine a direction of the selected segment 510.

At decision block 1820, the process 1800 involves determining whether the direction vector of the selected segment 510 indicates that the selected segment 510 is upward facing (i.e., is positioned at an upper edge of the glyph outline). To this end, an embodiment of the font animation system 100 (a) adjusts the direction vector based on the device state if needed and (2) determines whether the direction vector is pointing in a direction that indicates that the selected segment 510 is upward facing.

In some embodiments, if the font animation system 100 is utilizing a device state to determine how to apply the animation effect, then the font animation system 100 rotates the direction vector by the angle by which the down direction with respect to the glyphs 220 differs from the direction of gravity. In this manner, the direction vector is updated to account for the orientation of the device 130 and now represents the direction of the selected segment 510 with respect to gravity.

In some embodiments, the font animation system 100 determines whether the direction vector, as updated based on the direction of gravity if applicable, is pointing left. For instance, an embodiment of the font animation system 100 determines whether the x-coordinate of the direction vector is negative. Generally, a glyph outline is a closed path, which means that some segments 510 are directed to the left and some segments 510 are directed to the right. Further, in a typical glyph definition in a vector font, the left direction indicates a segment that is upward facing.

Figure 19:
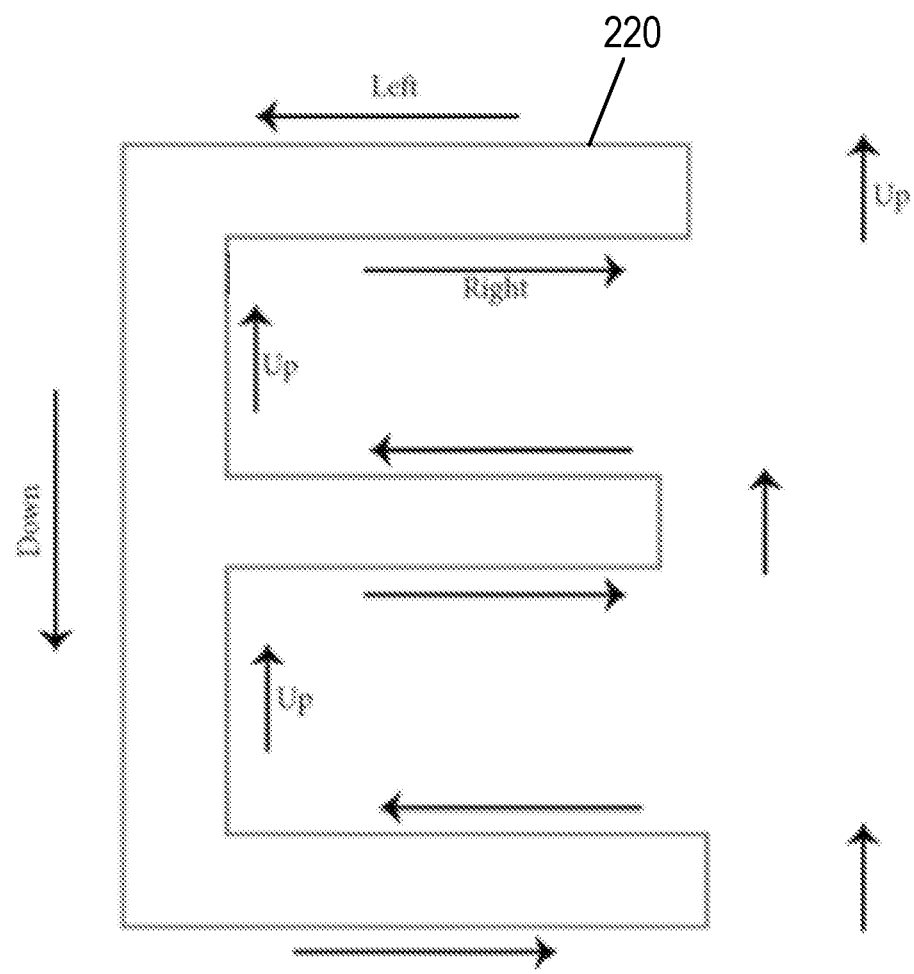
FIG. 19 shows an example of a glyph that includes segments pointing in various directions, according to some embodiments described herein.

For example, FIG. 19 shows an example of a glyph 220 that includes a set of segments 510, including segments 510 directed left, segments 510 directed right, segments 510 directed up, and segments 510 directed down, according to some embodiments. As shown, the segments 510 that are directed left are upward facing. Thus, in some embodiments, a direction vector that points left indicates that the selected segment is upward facing.

Referring back to FIG. 18, if the selected segment 510 fails to meet the condition of being upward facing (e.g., if the direction vector is not pointing left), the process 1800 proceeds to block 1825. At block 1825, the process 1800 involves generating the selected segment 510 as modified with randomized noise (i.e., creating a zigzag motion). In one example, the font animation system 100 modifies the segment 510 with randomized noise by updating the segment 510 as follows, where delta is a capped random number (i.e., in a range from zero up to a cap value):

$$x(t)=x_0+\text{delta}$$

$$y(t)=y_0+\text{delta}$$

After updating the segment according to the above, the process 1800 then skips to decision block 1840.

However, if the selected segment is upward facing, then the process 1800 proceeds to block 1830. At block 1830, the process 1800 involves determining how to modify the selected segment 510 to implement the animation effect. For instance, in the case of the fire effect, an embodiment of the font animation system 100 determines a look of a flame to add at the segment 510. In one example, the font animation system 100 generates a flame outline having a height and a width. The font animation system 100 computes the height as a function of the time point for which the keyframe is being generated, and the font animation system 100 selects a width that is randomized within a range to provide a realistic-looking flame. The shape of the flame can be selected (e.g., randomly) from a set of flame shapes maintained by the font animation system 100. At block 1835, the process 1800 involves generating the modified segment determined at block 1830 in place of the selected segment 510. In the case of applying a fire effect, an embodiment of the font animation system 100 generates the flame determined at block 1830 in place of the selected segment 510. The process 1800 then proceeds to decision block 1840.

At decision block 1840, the process 1800 involves determining whether any segments 510 of the glyphs 220 remain for selection and consideration. If such a segment exists, then the process 1800 returns to block 1810 to select another segment 510. However, if no such segment 510 remains, then an embodiment of the font animation system 100 outputs the generated keyframe at block 1845.

Figure 20:
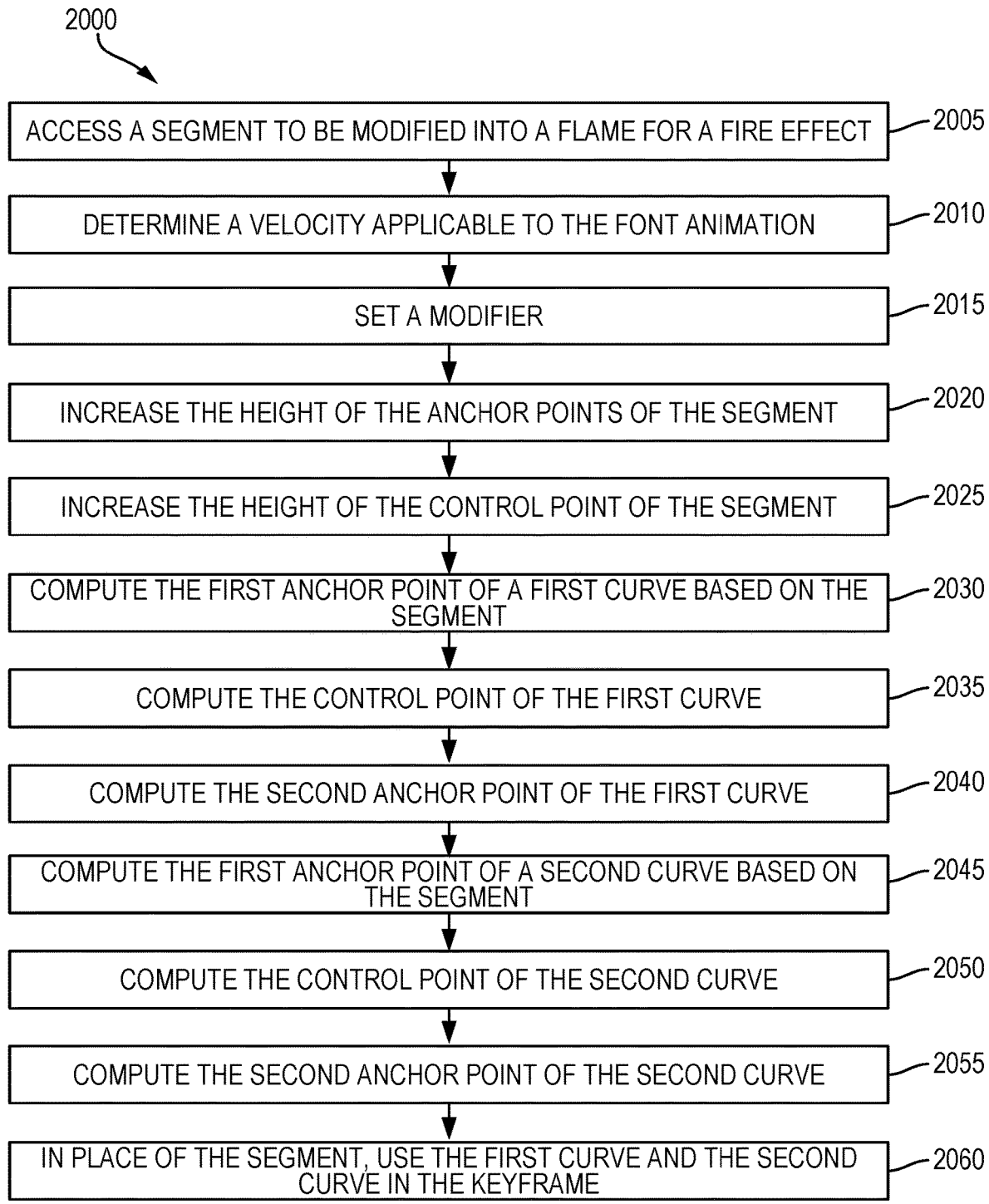
FIG. 20 is a diagram of a process of modifying a segment of a glyph to produce a flame in the fire effect, according to some embodiments described herein.

FIG. 20 is a diagram of a process 2000 of modifying a segment 510 of a glyph 220 to produce a flame in the fire effect, according to some embodiments described herein. For instance, an example of the font animation system 100 performs this process 2000 or similar at block 1830 of the above process 1800 when generating a keyframe of a font animation using a fire effect. Specifically, for each segment 510 deemed upward-facing at decision block 1820, the font animation system 100 performs this process 2000 to modify the segment to form a flame for a given keyframe associated with a given time point.

The process 2000 depicted in FIG. 20, as well as the other processes described herein, may be implemented in software (e.g., code, instructions, or programs) executed by one or more processing units (e.g., processors or processor cores), in hardware, or combinations thereof. The software may be stored on a non-transitory storage medium, such as on a memory device. The process 2000 depicted in FIG. 20 and described below is intended to be illustrative and non-limiting. Although FIG. 20 depicts various activities occurring in a particular sequence or order, this is not intended to be limiting. In certain embodiments, for instance, the activities may be performed in a different order, or one or more activities of the process 2000 may be performed in parallel. In certain embodiments, such as in the embodiment depicted in FIG. 1, the process 2000 may be performed by the font animation system 100.

As shown in FIG. 20, at block 2005, the process 2000 involves accessing a segment 510 to be modified into a flame. The segment 510 is represented as the ordered set ($P_1$, $P_2$, $P_3$), where $P_1$ is a first anchor point 640, $P_2$ is a control point 630, and $P_3$ is a second anchor point 640.

At block 2010, the process 2000 involves determining a velocity, v, applicable to the fire effect. In one example, if the device state is being used to determine one or more parameters of the animation effect, the velocity is a function of the velocity of the device 130. In another example, the velocity is set to a default value or to a value implicitly or explicitly set by a user.

At block 2015, the process 2000 involves setting a modifier, m, which will be used in conjunction with a random-number generator to determine certain values of anchor points 640 and control points 630 throughout the remainder of this process 2000. In one example, the modifier is m=5.

At block 2020, the process 2015 involves increasing the height of the anchor points 640 of the segment 510. For instance, each anchor point, $P_1$ and $P_3$, is increased by a value of the velocity multiplied by the time point (e.g., the time since the font animation started) divided in half, such that $$P_1 += \frac{v \times t}{2} \text{ and } P_3 += \frac{v \times t}{2}.$$

At block 2025, the process 2000 involves increasing the height of the control point 630. For instance, the control point, $P_2$, is increased by a value of twice velocity multiplied by the time point, such that $P_2 += 2$ (v×t). Thus, in some embodiments, the control point 630 is increased four times more than are the anchor points 640. In some embodiments, these updated values of the anchor points 640 and control point 630 of the segment 510 are carried over as current values for the segment 510 when determining how to modify the same segment 510 in the next keyframe (i.e., for the next time point).

In some embodiments, the segment 510 is divided into two curves that together make up a flame. For instance, a first curve is directed upward to a point of the flame, while a second curve is directed toward to a base of the flame. A first curve, Q, of the two curves is represented as the ordered set Q=($Q_1$, $Q_2$, $Q_3$), where $Q_1$ is a first anchor point 640, $Q_2$ is a control point 630, and $Q_3$ is a second anchor point 640, and a second curve, R, of the two curves is represented as the ordered set R=($R_1$, $R_2$, $R_3$), where $R_1$ is a first anchor point 640, $R_2$ is a control point 630, and $R_3$ is a second anchor point 640. As described below, to determine these two curves, the process 2000 determines the two anchor points 640 and the control point 630 for each of the two curves making up the flame, and the process further modifies the segment 510 by replacing the segment 510 with the two curves in the current keyframe.

At block 2030, the process 2000 involves computing the first anchor point, $Q_1$, of the first curve. In some embodiments, each of the x-value and the y-value of the first anchor point 640 of the first curve is set to a random number between 0 and the modifier, which was set at block 2015, plus the respective x- or y-value of the first anchor point 640 of the segment 510. In other words, $Q_1 = m \times \text{rand}() + P_1$, where rand( ) returns a random number between 0 and 1 inclusively.

At block 2035, the process 2000 involves computing the control point, $Q_2$, of the first curve. In some embodiments, each of the x-value and the y-value of the control point 630 of the first curve is set to a random number up to the modifier (i.e., between zero and the modifier), plus the average of the respective x- or y-value of the first anchor point 640 and the control point 630 of the segment 510. In other words, $$Q_2 = m \times \text{rand}() + \frac{P_1 + P_2}{2}.$$

At block 2040, the process 2000 involves computing the second anchor point, $Q_3$, of the first curve. In some embodiments, each of the x-value and the y-value of the second anchor point 640 of the first curve is set to a random number between 0 and the modifier, plus the respective x- or y-value of the control point 630 of the segment 510. In other words, $Q_3 = m \times \text{rand}() + P_2$.

At block 2045, the process 2000 involves computing the first anchor point, $R_1$, of the second curve. In some embodiments, each of the x-value and the y-value of the first anchor point 640 of the second curve is set to a random number between 0 and the modifier, which was set at block 2015, plus the respective x- or y-value of the control point 630 of the segment 510. In other words, $R_1 = m \times \text{rand}() + P_2$.

At block 2050, the process 2000 involves computing the control point, $R_2$, of the second curve. In some embodiments, each of the x-value and the y-value of the control point 630 of the second curve is set to a random number up to the modifier, plus the average of the respective x- or y-value of the control point 630 and the second anchor point 640 of the segment 510. In other words, $$R_2 = m \times \text{rand}() + \frac{P_2 + P_3}{2}.$$

At block 2055, the process 2000 involves computing the second anchor point, $R_3$, of the second curve. In some embodiments, each of the x-value and the y-value of the second anchor point 640 of the second curve is set to a random number between 0 and the modifier, plus the respective x- or y-value of the second anchor point 640 of the segment 510. In other words, $R_3 = m \times \text{rand}() + P_3$.

At block 2060, the process 2000 involves modifying the segment 510 by using the first curve and the second curve in place of the segment 510 in the keyframe. Thus, in some embodiments, when generating the keyframe, an embodiment of the font animation system 100 draws the first curve and the second curve to represent the segment 510. As such, the segment 510 is modified to a flame made up of two curves.

Figure 21:
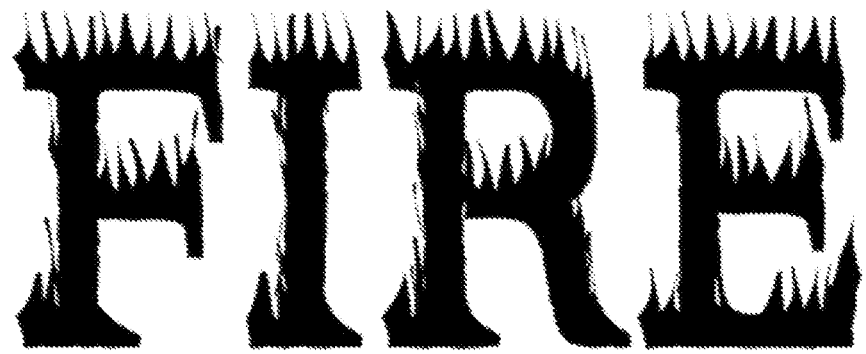
FIG. 21 shows one example of the fire effect, according to some embodiments described herein.
Figure 22:
FIG. 22 shows another example of the fire effect, according to some embodiments described herein.
Figure 23:
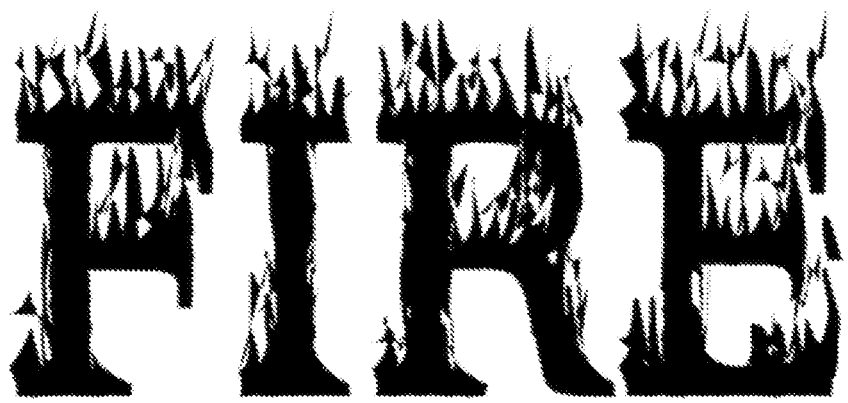
FIG. 23 shows yet another example of the fire effect, according to some embodiments described herein.

FIGS. 21-23 show examples of the fire effect, according to some embodiments described herein. In each of FIGS. 21-23, the flame shape is slightly different, and thus the process for determining the flame shape (e.g., as in FIG. 20) varies between these examples. For instance, the flame shapes in the examples of FIG. 21 and FIG. 22 are formed with types of Bezier curves that differ across the two examples. In some embodiments, one or more of various types of curves can make up a flame, such as Kappa curves, quadratic Bezier curves, or cubic Bezier curves. The flame shape in FIG. 23 is the same as in FIG. 21, except that a closed Bezier outline is positioned above certain flames (i.e., certain segments 510). These or other flame shapes can be implemented by the font animation system 100 and are within the scope of this disclosure.

Figure 24:
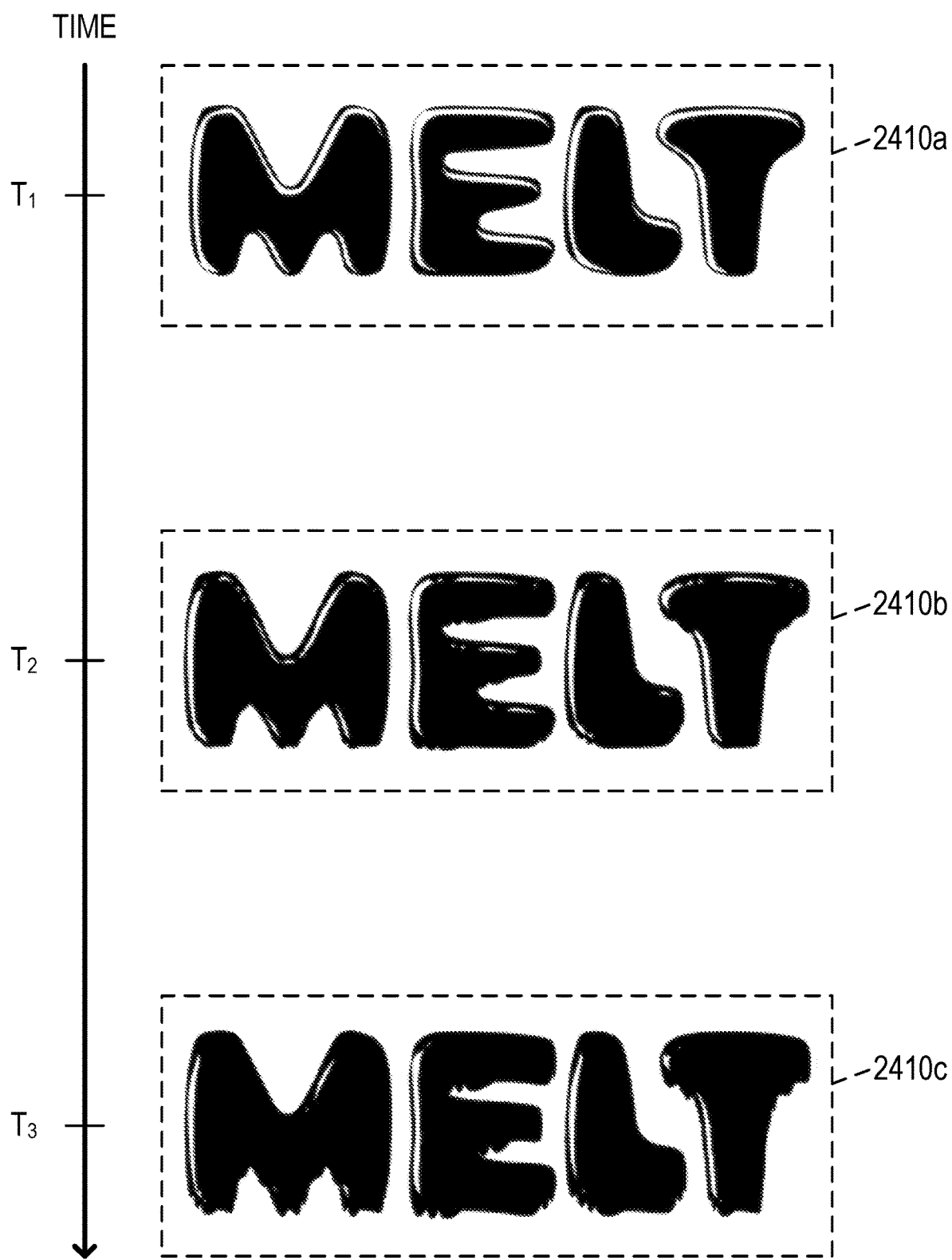
FIG. 24 shows an example of keyframes generated to provide a font animation based on a melting effect, according to some embodiments described herein.

FIG. 24 shows an example of keyframes generated by the font animation system 100 to provide a font animation based on a melting effect, according to some embodiments described herein. Specifically, FIG. 24 shows keyframes at three times, or time points, specifically $T_1$, $T_2$, and $T_3$. These keyframes are respectively referred to as the first keyframe 2410a, the second keyframe 2410b, and the third keyframe 2410c; however, it will be understood that a font animation can have more or fewer keyframes. In this example, four glyphs 220, specifically glyphs 220 of the letters M, E, L, and T in a specific font were typed by a user or otherwise input into the font animation system 100. Together, the glyphs 220 form the word MELT. The user requests that an animation effect, specifically a melting effect, be applied to the glyphs 220 to provide a font animation. Responsive to this request, an example of the font animation system 100 generates the first keyframe 2410a based on the initial appearance of the glyphs 220. The font animation system 100 generates additional keyframes, including the second keyframe 2410b and the third keyframe 2410c, based on movements of glyph points 910 identified for the glyphs 220 based on an effect function associated with the melting effect.

In some embodiments, the melting effect simulates the melting of something physical, similar to the melting of ice or ice cream. Due to gravity, when something melts, it melts downward. Thus, an example of the melting effect creates curves, which look like droplets, growing downward over time. In some embodiments, the font animation system 100 provides the melting effect across all segments 510 (e.g., all sub-segments 810) of a glyph 220. Alternatively, however, an embodiment provides the melting effect to segments 510 selectively such that, for instance, droplets appear only on downward-facing segments 510 of the glyph 220. Regardless of whether all segments 510 or only a proper subset of segments 510 are modified by the melting effect, however, the size of the segments 510 can determine the thickness or length of the resulting droplets.

Figure 25:
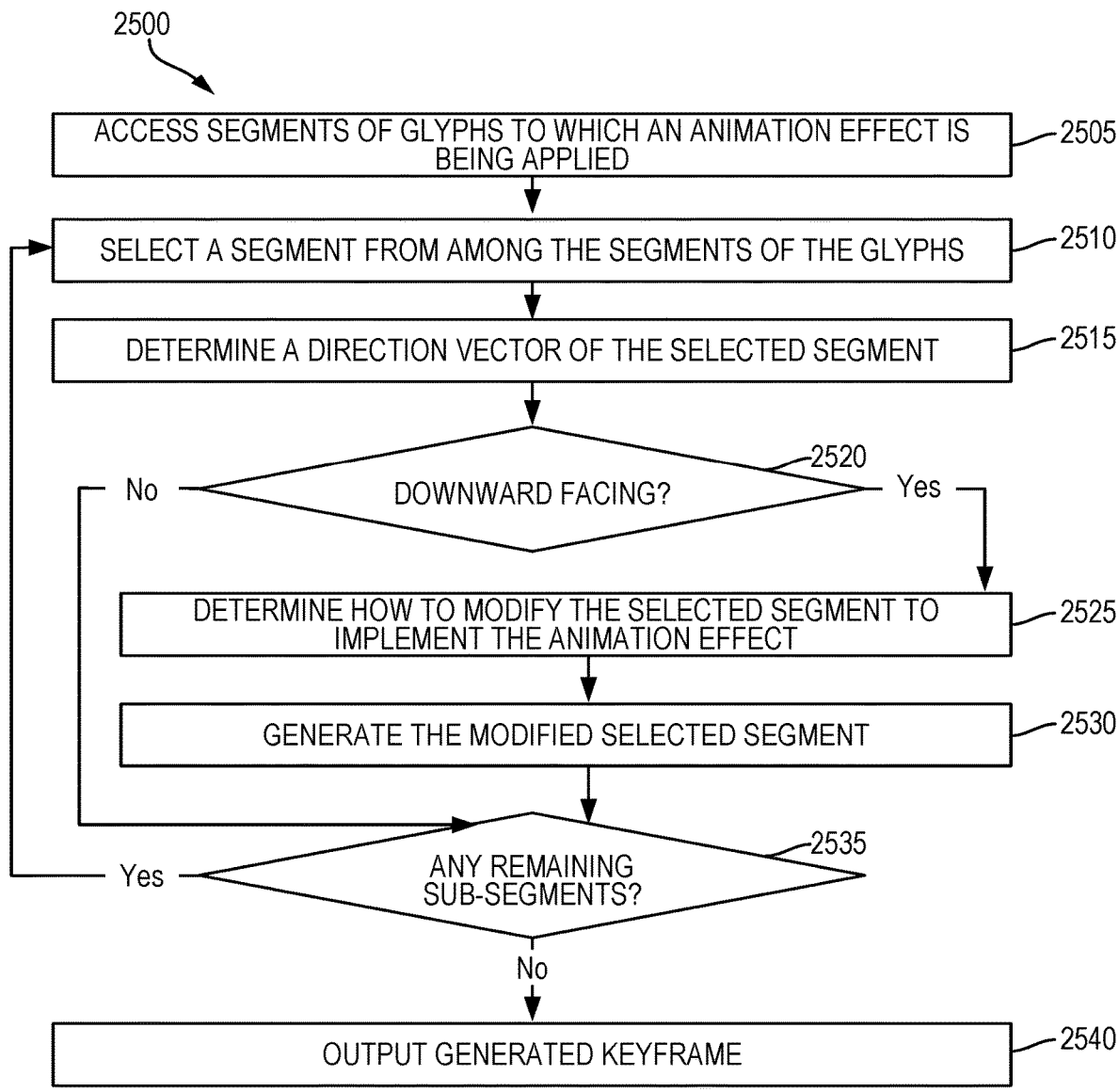
FIG. 25 is a diagram of a process of generating keyframes using a melting effect or other downward animation effect, according to some embodiments described herein.

FIG. 25 is a diagram of a process 2500 of generating a font animation using a melting effect or other downward animation effect (i.e., an animation effect that impacts only downward-facing segments 510), according to some embodiments described herein. An embodiment of the font animation system 100 can perform this process 2500 when generating a keyframe in an instance where the font animation system 100 is applying the melting effect or another downward-facing effect. For instance, the font animation system 100 can perform this process 2500 or similar at block 315 of the process 300 of FIG. 3 for each keyframe, at block 1010 or block 1025 of the process 1000 of FIG. 10, at block 1125 or block 1140 of the process 1100 of FIG. 3, or elsewhere as needed. In some embodiments, prior to operation of this process 2500, the font animation system 100 has identified segments 510 of the glyphs 220 to be animated.

The process 2500 depicted in FIG. 25, as well as the other processes described herein, may be implemented in software (e.g., code, instructions, or programs) executed by one or more processing units (e.g., processors or processor cores), in hardware, or combinations thereof. The software may be stored on a non-transitory storage medium, such as on a memory device. The process 2500 depicted in FIG. 25 and described below is intended to be illustrative and non-limiting. Although FIG. 25 depicts various activities occurring in a particular sequence or order, this is not intended to be limiting. In certain embodiments, for instance, the activities may be performed in a different order, or one or more activities of the process 2500 may be performed in parallel. In certain embodiments, such as in the embodiment depicted in FIG. 1, the process 2500 may be performed by the font animation system 100.

As shown in FIG. 25, at block 2505, the process 2500 involves accessing segments 510 of glyphs 220 to which the animation effect (e.g., the melting effect or other downward animation effect) is to be applied. In some embodiments, the segments 510 include sub-segments 810 determined from larger segments 510. For instance, an example of the font animation system 100 determined the segments 510, which are sub-segments, using the process 400 of FIG. 4 or similar.

At block 2510, the process 2500 involves selecting a segment 510 from among the segments 510 accessed at block 2505, where the selected segment 510 has not yet been considered in a loop iteration. The selected segment 510 is defined by the ordered set ($P_1$, $P_2$, $P_3$), where $P_1$ is a first anchor point 640, $P_2$ is a control point 630, and $P_3$ is a second anchor point 640. An embodiment of the font animation system 100 loops over the various segments 510, determining for each segment 510 in turn whether to modify the segment 510 based on the animation effect.

At block 2515, the process 2500 involves determining a direction, or direction vector, of the selected segment 510 that was selected at block 2510. For instance, an embodiment of the font animation system 100 determines a direction of the selected segment 510 by subtracting $P_3-P_1$, where the resulting direction vector describes the direction of the selected segment 510. However, it will be understood that other techniques are useable to determine a direction of the selected segment 510.

At decision block 2520, the process 2500 involves determining whether the direction vector of the selected segment 510 indicates that the selected segment 510 is downward facing (i.e., is positioned at a lower edge of the glyph outline). To this end, an embodiment of the font animation system 100 (a) adjusts the direction vector based on the device state if needed and (2) determines whether the direction vector is pointing in a direction that indicates that the selected segment 510 is downward facing.

In some embodiments, if the font animation system 100 is utilizing a device state to determine how to apply the animation effect, then the font animation system 100 rotates the direction vector by the angle by which the down direction with respect to the glyphs 220 differs from the direction of gravity. In this manner, the direction vector is updated to account for the orientation of the device 130 and now represents the direction of the selected segment 510 with respect to gravity.

In some embodiments, the font animation system 100 determines whether the direction vector, as updated based on the direction of gravity if applicable, is pointing right. For instance, an embodiment of the font animation system 100 determines whether the x-coordinate of the direction vector is positive because, in a typical glyph definition in a vector font, the right direction indicates a segment that is downward facing.

If the selected segment 510 fails to meet the condition of being downward facing (e.g., if the direction vector is not pointing right), the process 2500 proceeds to decision block 2535. However, if the selected segment 510 is downward facing, then the process 2500 proceeds to block 2525.

At block 2525, the process 2500 involves determining how to modify the selected segment 510 to implement the animation effect. For instance, in the case of the melting effect, an embodiment of the font animation system 100 determines a look of a droplet to add at the segment 510. In one example, the font animation system 100 generates a droplet outline having a height and a width. The font animation system 100 computes the height as a function of the time point for which the keyframe is being generated, and the font animation system 100 selects a width equal to the width of the selected segment 510. In one example, to allow some variation is droplet lengths across segments 510, the font animation system 100 utilizes different height for droplets of adjacent segments 510, such as by adding a randomizing the height within a range that is based on the time point of the keyframe. Further, the shape of the curve used for the droplet can be selected (e.g., randomly) from a set of droplet shapes maintained by the font animation system 100. At block 2530, the process 2500 involves generating the modified segment determined at block 2525 in place of the selected segment 510. In the case of applying a melting effect, an embodiment of the font animation system 100 generates the droplet determined at block 2525 in place of the selected segment 510. The process 2500 then proceeds to decision block 2535.

At decision block 2535, the process 2500 involves determining whether any segments 510 of the glyphs 220 remain for selection and consideration. If such a segment exists, then the process 2500 returns to block 2510 to select another segment 510. However, if no such segment 510 remains, then an embodiment of the font animation system 100 outputs the generated keyframe at block 2540.

Figure 26:
FIG. 26 shows one example of the melting effect, according to some embodiments described herein.
Figure 27:
FIG. 27 shows another example of the melting effect, according to some embodiments described herein.
Figure 28:
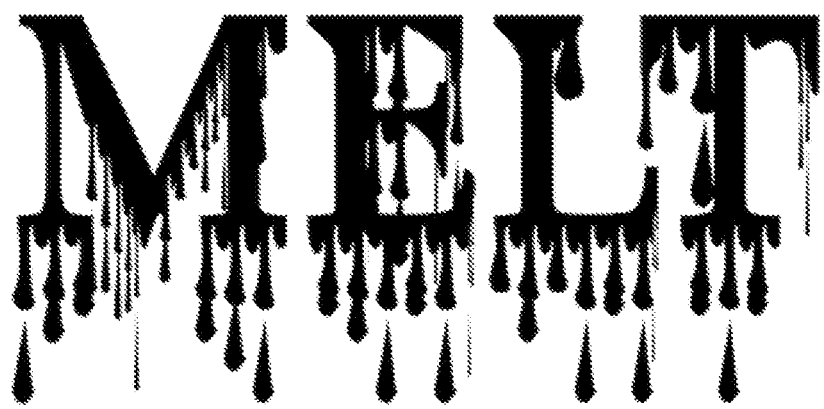
FIG. 28 shows yet another example of the melting effect, according to some embodiments described herein.

FIGS. 26-28 show examples of the melting effect, according to some embodiments described herein. In each of FIGS. 26-28, the droplet shape is slightly different and thus a process for determining the droplet shape varies between these examples. For instance, the droplet shapes in the examples of FIG. 26 and FIG. 27 are formed with outlines including Bezier curves whose types differ between the two examples. In some embodiments, one or more of various types of curves can make up a droplet, such as Kappa curves, quadratic Bezier curves, or cubic Bezier curves. The droplet shape in FIG. 28 is the same as in FIG. 27, except that a closed Bezier path is positioned below certain droplets (i.e., certain segments 510). These or other droplet shapes can be implemented by the font animation system 100 and are within the scope of this disclosure.

Figure 29:
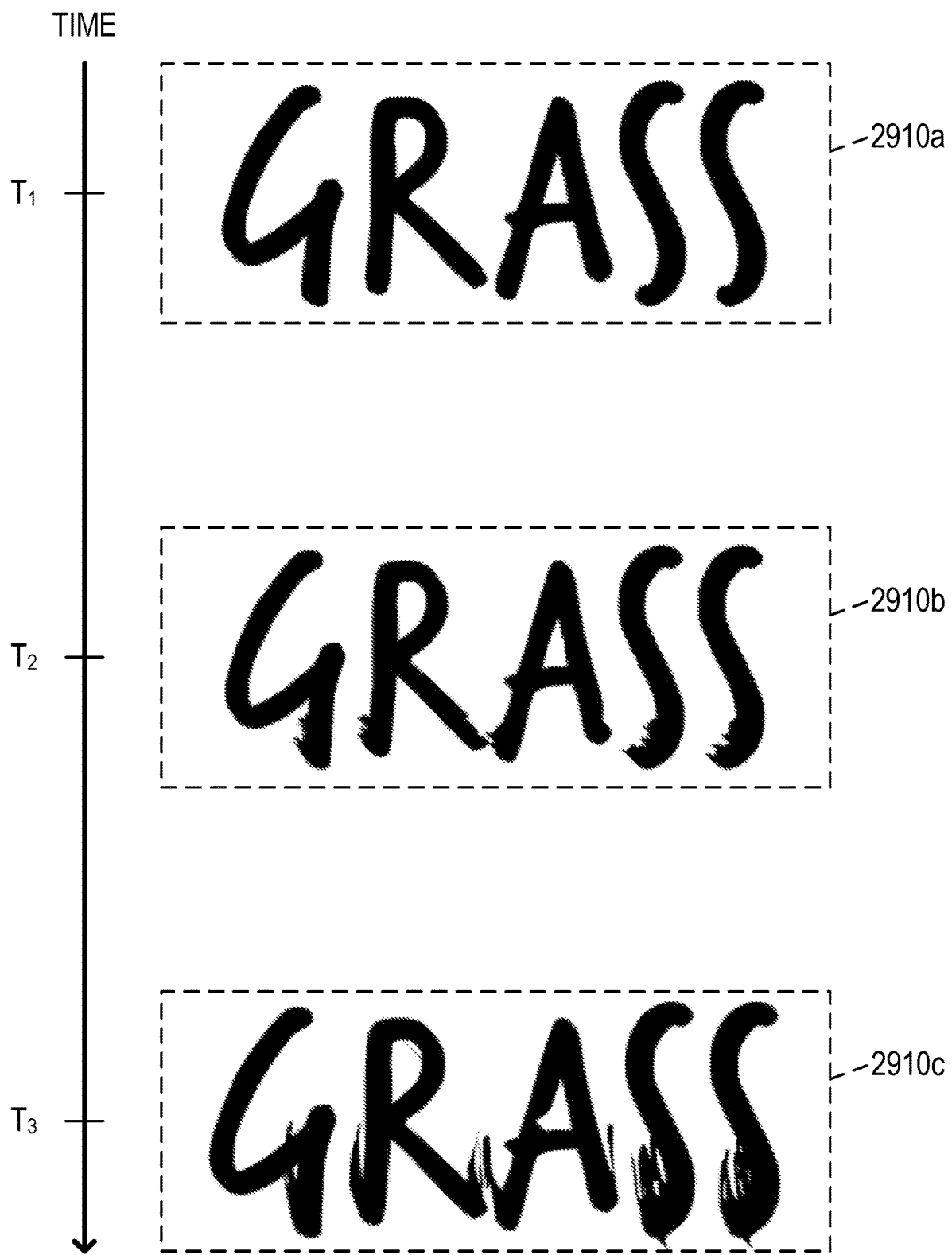
FIG. 29 shows an example of keyframes generated to provide a font animation based on a grass effect, according to some embodiments described herein.

FIG. 29 shows an example of keyframes generated by the font animation system 100 to provide a font animation based on a grass effect, according to some embodiments described herein. Specifically, FIG. 29 shows keyframes at three times, or time points, specifically $T_1$, $T_2$, and $T_3$. These keyframes are respectively referred to as the first keyframe 2910a, the second keyframe 2910b, and the third keyframe 2910c; however, it will be understood that a font animation can have more or fewer keyframes. In this example, five glyphs 220, specifically glyphs 220 of the letters G, R, A, S, and S in a specific font were typed by a user or otherwise input into the font animation system 100. Together, the glyphs 220 form the word GRASS. The user requests that an animation effect, specifically a grass effect, be applied to the glyphs 220 to provide a font animation. Responsive to this request, an example of the font animation system 100 generates the first keyframe 2910a based on the initial appearance of the glyphs 220. The font animation system 100 generates additional keyframes, including the second keyframe 2910b and the third keyframe 2910c, based on movements of glyph points 910 identified for the glyphs 220 based on an effect function associated with the melting effect.

In some embodiments, the grass effect simulates the growth of grass from the ground, where the ground corresponds to segments 510 at or close to the baseline (i.e., the bottom) of the glyphs 220. Thus, an example of an effect function utilized to implement the grass effect is conditional, time-based, and applicable to segments 510. For instance, using such an effect function, the font animation system 100 modifies a segment 510 having an anchor point 640 with a y-positions lower than a threshold so as to modify the segment 510 by adding an upward extension from that segment 510 that grows over time.

The above examples do not limit the various animation effects that can be implemented by the font animation system 100. For example, other animation effects include a leaf effect, in which leaves are added to arbitrarily selected segments 510 of a glyph 220 by replacing such segments 510 with corresponding leaf outlines, and a freefall effect, in which glyph points 910 of the glyph 220 move according to the magnitude and direction of movement of the device 130. Some embodiments described herein implement one or more of the above animation effects or others.

Example Implementation

Figure 30:
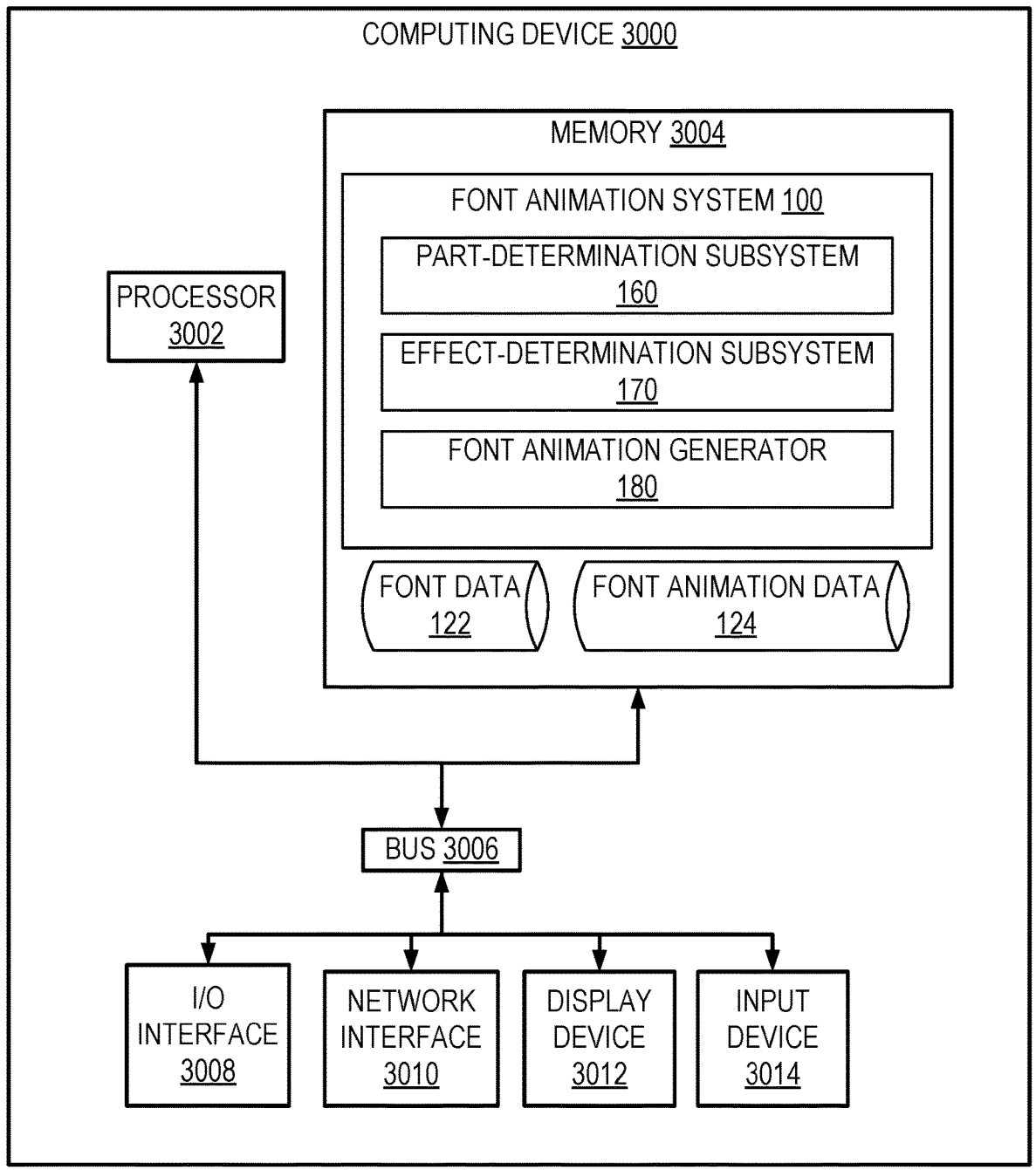
FIG. 30 shows an example of a computing system that performs certain operations of the font animation system, according to some embodiments described herein.

Any suitable computing system or group of computing systems can be used for performing the operations described herein. For example, FIG. 30 depicts an example of a computing device 3000 that executes the font animation system 100, including the part-determination subsystem 160, the effect-determination subsystem 170, and the font animation generator 180. The computing device 3000 depicted in FIG. 30 may be used to implement various systems, subsystems, and servers described in this disclosure. For instance, the computing device 3000 may act as the computing system 105 or the device 130 depicted in FIG. 1.

In FIG. 30, the depicted example of a computing device 3000 includes a processor 3002 communicatively coupled to one or more memory devices 3004. The processor 3002 executes computer-executable program code stored in a memory device 3004, accesses information stored in the memory device 3004, or both. Examples of the processor 3002 include a microprocessor, an application-specific integrated circuit (ASIC), a field-programmable gate array (FPGA), or any other suitable processing device. The processor 3002 can include any number of processing devices, including a single processing device.

The memory device 3004 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, Read-Only Memory (ROM), Random-Access memory (RAM), an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, or ActionScript.

The computing device 3000 may also include a number of external or internal devices, such as input or output devices. For example, the computing device 3000 is shown with one or more input/output (I/O) interfaces 3008. An I/O interface 3008 can receive input from input devices (e.g., input device 3014) or provide output to output devices (e.g., display device 3012). One or more buses 3006 are also included in the computing device 3000. The bus 3006 communicatively couples components together in the computing device 3000.

The computing device 3000 executes program code that configures the processor 3002 to perform one or more of the operations described herein. The program code may correspond to the part-determination subsystem 160, the effect-determination subsystem 170, the font animation generator 180, or other suitable applications that perform one or more operations described herein. The program code may be resident in the memory device 3004 or any suitable computer-readable medium and may be executed by the processor 3002 or any other suitable processor. In some embodiments, the part-determination subsystem 160, the effect-determination subsystem 170, and the font animation generator 180 are stored in the memory device 3004, as depicted in FIG. 30. In additional or alternative embodiments, one or more of the part-determination subsystem 160, the effect-determination subsystem 170, and the font animation generator 180 are accessible to the computing device 3000 but are stored in a different memory device of a different computing device. In additional or alternative embodiments, the program code described above is stored in one or more other memory devices accessible via a data network.

In some embodiments, one or more of the data sets, models, and functions utilizes by the font animation system 100 are stored in the same memory device (e.g., the memory device 3004). For example, the computing device 3000 could be the computing system 105 of FIG. 1 and could host the part-determination subsystem 160, the effect-determination subsystem 170, and the font animation generator 180 as well as the font data 122 and the font animation data 124. In additional or alternative embodiments, one or more of the programs, data sets, models, and functions described herein are stored in one or more other memory devices accessible via a data network. For instance, in some embodiments, the font data 122 and the font animation data 124 are stored locally, and one or more of the part-determination subsystem 160, the effect-determination subsystem 170, and the font animation generator 180 are executed on a different computing device and access the font data 122 and the font animation data 124 over the data network. In another embodiment, the part-determination subsystem 160, the effect-determination subsystem 170, and the font animation generator 180 need not all be executed on the same computing device as one another.

The computing device 3000 also includes a network interface device 3010. The network interface device 3010 includes any device or group of devices suitable for establishing a wired or wireless data connection to one or more data networks. Non-limiting examples of the network interface device 3010 include an Ethernet network adapter, a modem, and the like. The computing device 3000 is able to communicate with one or more other computing devices via a data network using the network interface device 3010.

Figure 31:
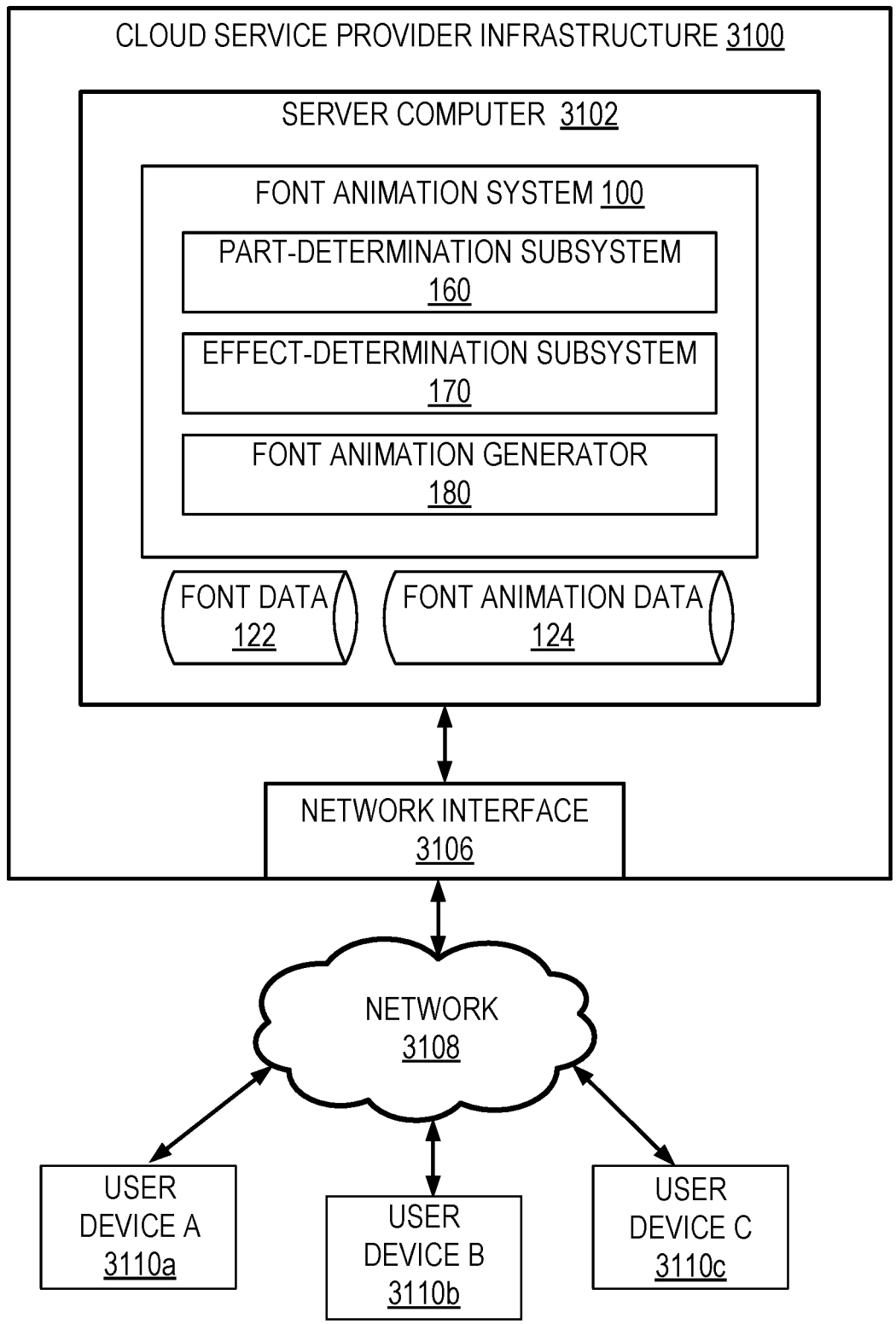
FIG. 31 shows an example of a cloud infrastructure offering a service for font animation, according to some embodiments described herein.

In some embodiments, the functionality provided by the computing device 3000 may be offered via a cloud-based service implemented as a cloud infrastructure 3100, also referred to as a cloud service provider infrastructure, provided by a cloud service provider. For example, FIG. 31 depicts an example of a cloud infrastructure 3100 offering one or more services including a service for font animation as described herein. The infrastructure may include one or more servers computers 3102 that implement such service, e.g., by running software or hardware. Such a service can be subscribed to and used by a number of user subscribers using user devices 3110*a*, 3110*c*, and 3110*c* (collectively 3110) across a network 3108. Each user device 3110 may act as the device 130 described herein, such that, in some embodiments, the font animation system 100 utilizes a device state of such a user device 3110. The service may be offered under a Software as a Service (SaaS) model, and one or more users may subscribe to such as service.

In the embodiment depicted in FIG. 31, the cloud infrastructure 3100 includes one or more server computers 3102 that are configured to perform processing to provide one or more services offered by the cloud service provider. One or more of server computers 3102 implement the part-determination subsystem 160, the effect-determination subsystem 170, and the font animation generator 180 that provide functionalities described herein and maintain font data 122 and font animation data 124. Additionally or alternatively, however, each user device 3110 maintains its own font data 122 or font animation data 124, or both. For example, a server computer 3102 executes software to implement the services and functionalities provided by the part-determination subsystem 160, the effect-determination subsystem 170, and the font animation generator 180, where the software, when executed by one or more processors of the server computers 3102, causes provision of the services and functionalities described herein.

Program code or other instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, or ActionScript. In various examples, the server computers 3102 can include volatile memory, nonvolatile memory, or a combination thereof.

In the embodiment depicted in FIG. 31, the cloud infrastructure 3100 also includes a network interface device 3106 that enables communications to and from the cloud infrastructure 3100. In certain embodiments, the network interface device 3106 includes any device or group of devices suitable for establishing a wired or wireless data connection to the network 3108. Non-limiting examples of the network interface device 3106 include an Ethernet network adapter, a modem, or the like. The cloud infrastructure 3100 is able to communicate with the user devices 3110*a*, 3110*b*, and 3110*c* via the network 3108 using the network interface device 3106.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
  accessing segments of a glyph that symbolizes a font character;
  generating sub-segments of the glyph by applying an automated segmenting function to the segments;
  determining glyph points for the glyph based on the sub-segments of the glyph;
  for a glyph point in the glyph points, computing positions for the glyph point at time points by, for each time point of the time points, applying an effect function to the glyph point; and
  generating keyframes corresponding to the time points, wherein each keyframe in the keyframes corresponds to a respective time point in the time points and includes an animation effect generated for the glyph based on respective positions computed for the glyph points at the time point, wherein a font animation is based on the keyframes.

2. The method of claim 1, wherein each glyph point of the glyph points is assigned a respective mass, and wherein the effect function is a force function that applies a force to each glyph point of the glyph points.

3. The method of claim 1, further comprising converting the segments to curve segments, wherein generating the sub-segments comprises dividing the curve segments into curve sub-segments.

4. The method of claim 1, further comprising detecting a state of a device, wherein the effect function is based on the state of the device.

5. The method of claim 4, wherein detecting the state of the device comprises detecting a force exerted on the device, and wherein the effect function is based on the force exerted on the device.

6. The method of claim 4, wherein detecting the state of the device comprises detecting a velocity of the device, and wherein the effect function is based on the velocity of the device.

7. The method of claim 4, wherein detecting the state of the device comprises detecting an orientation of the device, and wherein the effect function is based on the orientation of the device.

8. The method of claim 4, wherein a first motion of the device is in a first direction, and wherein the font animation is based on the first motion of the device, and the method further comprising:

generating a second font animation based on a second motion of the device in a second direction.

9. The method of claim 1, wherein generating the keyframes comprises:

determining a first direction of a first sub-segment of the glyph;

modifying the first sub-segment for a keyframe of the keyframes, based on the first direction;

determining a second direction of a second sub-segment of the glyph; and deciding not to modify the second sub-segment for the keyframe, based on the second direction.

10. The method of claim 9, wherein determining the first direction of the first sub-segment of the glyph is based on a direction of gravity.

11. The method of claim 1, wherein generating the sub-segments of the glyph by applying the automated segmenting function comprises dividing a segment of the segments into a quantity of sub-segments until each sub-segment of the segments is no longer than a reference length.

12. The method of claim 11, wherein the reference length is based on a dimension of the glyph and on a user-configurable parameter.

13. A system comprising:

a processor configured to execute computer-readable instructions; and a memory configured to store the computer-readable instructions that, when executed by the processor, cause the processor to perform operations comprising:

accessing segments of a glyph that symbolizes a font character;

generating sub-segments of the glyph by applying an automated segmenting function to the segments;

determining glyph points for the glyph based on the sub-segments of the glyph;

for a glyph point in the glyph points, computing positions for the glyph point at time points by, for each time point of the time points, applying an effect function to the glyph point; and generating keyframes corresponding to the time points, wherein each keyframe in the keyframes corresponds to a respective time point in the time points and includes an animation effect generated for the glyph based on respective positions computed for the glyph points at the time point, wherein a font animation is based on the keyframes.

14. The system of claim 13, wherein each glyph point of the glyph points is assigned a respective mass, and wherein the effect function is a force function that applies a force to each glyph point of the glyph points.

15. The system of claim 13, the operations further comprising converting the segments to curve segments, wherein generating the sub-segments comprises dividing the curve segments into curve sub-segments.

16. The system of claim 13, the operations further comprising detecting a state of a device, wherein the effect function is based on the state of the device.

17. The system of claim 16, wherein detecting the state of the device comprises detecting a force exerted on the device, and wherein the effect function is based on the force exerted on the device.

18. A method in which one or more processing devices perform operations comprising:

receiving a request for a font animation of a glyph that symbolizes a font character;

accessing segments of the glyph;

determining a respective direction of each segment in the segments of the glyph;

generating keyframes corresponding to time points, wherein each keyframe in the keyframes corresponds to a respective time point in the time points, and wherein generating a keyframe comprises:

for each segment in the segments having a direction meeting a condition, applying a modification to the segment in the keyframe; and for each segment in the segments having a direction that fails to meet a condition, deciding not to apply the modification to the segment in the keyframe;

wherein the font animation is based on the keyframes.

19. The method of claim 18, further comprising preprocessing the segments by converting the segments to curve segments.

20. The method of claim 18, further comprising detecting a state of a device, wherein determining a direction of a segment is based on the state of the device.

* * * * *